(12) United States Patent
Losic et al.

(10) Patent No.: US 10,864,498 B2
(45) Date of Patent: Dec. 15, 2020

(54) COMPOSITE GRAPHENE-BASED MATERIAL

(71) Applicant: Adelaide Research & Innovation Pty Ltd, Adelaide (AU)

(72) Inventors: Dusan Losic, Seaford Rise (AU); Diana Tran, Burton (AU); Shervin Kabiri, Payneham (AU)

(73) Assignee: Adelaide Research & Innovation Pty Ltd, Adelaide (AU)

( * ) Notice: Subject to any disclaimer, the term of this patent is extended or adjusted under 35 U.S.C. 154(b) by 0 days.

(21) Appl. No.: 15/578,149

(22) PCT Filed: May 27, 2016

(86) PCT No.: PCT/AU2016/050417
§ 371 (c)(1),
(2) Date: Nov. 29, 2017

(87) PCT Pub. No.: WO2016/191802
PCT Pub. Date: Dec. 8, 2016

(65) Prior Publication Data
US 2018/0133688 A1    May 17, 2018

(30) Foreign Application Priority Data

May 29, 2015    (AU) ................ 2015902012

(51) Int. Cl.
*B01J 20/28* (2006.01)
*B01D 15/00* (2006.01)
(Continued)

(52) U.S. Cl.
CPC ........ *B01J 20/28026* (2013.01); *B01D 15/00* (2013.01); *B01D 15/08* (2013.01);
(Continued)

(58) Field of Classification Search
CPC .. B01D 15/00; B01D 15/08; B01D 2253/102; B01D 2253/106; B01D 2253/108;
(Continued)

(56) References Cited

U.S. PATENT DOCUMENTS 5,460,643 A    10/1995   Hasenpusch et al.
7,556,672 B2    7/2009   Jadhav
(Continued)

FOREIGN PATENT DOCUMENTS

CN    102910625 A    2/2013
CN    102941042 A    2/2013
(Continued)

OTHER PUBLICATIONS

Kabiri et al. "Graphene-Diatom Silica Aerogels for Efficient Removal of Mercury Ions from Water", ACS Applied Materials & Interfaces, Apr. 2, 2015, vol. 7, pp. 11815-11823 (Year: 2015).*
(Continued)

*Primary Examiner* — Latosha Hines

(57) ABSTRACT

The present invention provides composite material having a porous graphene-based foam matrix and comprising porous inorganic micro-particles and metal oxide nano-particles distributed throughout the foam matrix.

15 Claims, 6 Drawing Sheets

(51) Int. Cl.

| | |
|---|---|
| *C02F 1/28* | (2006.01) |
| *B01J 20/20* | (2006.01) |
| *B01D 15/08* | (2006.01) |
| *B01D 53/02* | (2006.01) |
| *C01B 32/192* | (2017.01) |
| *B01J 20/32* | (2006.01) |
| *B01J 20/06* | (2006.01) |
| *B01J 20/02* | (2006.01) |
| *B01J 20/14* | (2006.01) |
| *B01J 20/30* | (2006.01) |
| *C02F 101/32* | (2006.01) |
| *C02F 101/20* | (2006.01) |

(52) U.S. Cl.
CPC .......... *B01D 53/02* (2013.01); *B01J 20/0229* (2013.01); *B01J 20/0233* (2013.01); *B01J 20/06* (2013.01); *B01J 20/14* (2013.01); *B01J 20/20* (2013.01); *B01J 20/205* (2013.01); *B01J 20/28009* (2013.01); *B01J 20/28011* (2013.01); *B01J 20/305* (2013.01); *B01J 20/3085* (2013.01); *B01J 20/3242* (2013.01); *B01J 20/3248* (2013.01); *B01J 20/3257* (2013.01); *B01J 20/3274* (2013.01); *B01J 20/3289* (2013.01); *C01B 32/192* (2017.08); *C02F 1/28* (2013.01); *C02F 1/281* (2013.01); *C02F 1/288* (2013.01); *B01D 2253/102* (2013.01); *B01D 2253/106* (2013.01); *B01D 2253/108* (2013.01); *B01D 2253/1124* (2013.01); *B01D 2253/25* (2013.01); *B01D 2253/304* (2013.01); *B01D 2257/60* (2013.01); *B01D 2257/602* (2013.01); *B01D 2258/0283* (2013.01); *C02F 1/283* (2013.01); *C02F 2101/20* (2013.01); *C02F 2101/32* (2013.01); *C02F 2305/08* (2013.01)

(58) Field of Classification Search
CPC ........ B01D 2253/1124; B01D 2253/25; B01D 2253/304; B01D 2257/60; B01D 2257/602; B01D 2258/0283; B01D 53/02; B01J 20/229; B01J 20/0233; B01J 20/06; B01J 20/14; B01J 20/20; B01J 20/205; B01J 20/28009; B01J 20/28011; B01J 20/28026; B01J 20/305; B01J 20/3085; B01J 20/3242; B01J 20/3248; B01J 20/3257; B01J 20/3274; B01J 20/3289; C01B 32/192; C02F 1/192; C02F 1/281; C02F 1/283; C02F 1/288; C02F 2101/20; C02F 2101/32; C02F 2305/08
See application file for complete search history.

(56) References Cited

U.S. PATENT DOCUMENTS

| | | | |
|---|---|---|---|
| 7,585,847 B2 | 9/2009 | Bratzler et al. | |
| 7,955,576 B2 | 6/2011 | Cross et al. | |
| 8,263,525 B1 | 9/2012 | Skandan et al. | |
| 8,598,072 B2 | 12/2013 | Sato et al. | |
| 8,906,973 B2 | 12/2014 | Rhine et al. | |
| 2011/0224376 A1 | 9/2011 | Zhai et al. | |
| 2012/0034442 A1 | 2/2012 | Pauzauskie et al. | |
| 2013/0202890 A1* | 8/2013 | Kong ....................... | H01B 1/02 428/402 |
| 2013/0314844 A1 | 11/2013 | Chen et al. | |
| 2014/0255279 A1 | 9/2014 | Olson et al. | |
| 2014/0287641 A1* | 9/2014 | Steiner, III ................ | B32B 5/26 442/223 |

FOREIGN PATENT DOCUMENTS

| | | |
|---|---|---|
| CN | 103157410 A | 6/2013 |
| CN | 103285813 A | 9/2013 |
| CN | 103407997 A | 11/2013 |
| CN | 103525113 | 1/2014 |
| EP | 2092979 B1 | 8/2009 |
| WO | WO-2012/170086 A1 | 12/2012 |
| WO | WO-2013/116733 A1 | 8/2013 |
| WO | WO-2014/011527 A1 | 1/2014 |

OTHER PUBLICATIONS

Chen et al., "Kinetic study on removal of copper (II) using goethite and hematite nano-photocatalysts," J. Colloid Interface Sci. 347 (2010) 277-281.
Fan et al., "Modeling Pb sorption to microporous amorphous oxides as discrete particles and coatings," J. Colloid Interface Sci. 281 (2005) 39-48.
Hu et al., "Removal and recovery of Cr (VI) from wastewater by maghemite nanoparticles," Water Res. 39 (2005) 4528-4536.
Hu et al., "Selective removal of heavy metals from industrial wastewater using maghemite nanoparticle: Performance and mechanisms," J. Environ. Eng.-ASCE. 132 (2006) 709-715.
Su et al., "Use of hydrous manganese dioxide as a potential sorbent for selective removal of lead, cadmium, and zinc ions from water," J. Colloid Interface Sci. 349 (2010) 607-612.
Koivula et al., "Use of hydrometallurgical wastewater as a precursor for the synthesis of cryptomelane-type manganese dioxide ion exchange material," Sep. Purif. Technol. 70 (2009) 53-57.
Pakarinen et al., "Nanoporousmanganese oxides as environmental protective materials—effect of Ca and Mg on metals sorption," J. Hazard. Mater. 180 (2010) 234-240.
Liang et al., Nanometer-size titanium dioxide separation/preconcentration and FAAS determination of trace Zn and Cd in water sample, Int. J. Environ. Anal. Chem. 84 (2004) 315-321.
Engates et al., "Adsorption of Pb, Cd, Cu, Zn, and Nito titanium dioxide nanoparticles: effect of particle size, solid concentration, and exhaustion," Environ. Sci. Pollut. Res. 18 (2011) 386-395.
Tarasevich et al., "Complex-forming adsorbents based on kaolinite, aluminium oxide and polyphosphates for the extraction and concentration of heavy metal ions from water solutions," Appl. Clay Sci. 19 (2001) 95-101.
Pu et al., Gamma-MPTMS modified nanometer sized alumina micro-column separation and preconcentration of trace amounts of Hg, Cu Au and Pd in biological, environmental and geological samples and their determination by inductively coupled plasma mass spectrometry, J. Anal. Atom. Spectrom. 19 (2004) 984-989.
Afkhami et al., Simultaneous removal of heavymetal ions in wastewater samples using nano-alumina modified with 2, 4-dinitrophenylhydrazine, J. Hazard. Mater. 181 (2010) 836-844.
Ma et al., A novel strategy to prepare ZnO/PbS heterostructured functional nanocomposite utilizing the surface adsorption property of ZnO nanosheets, Catal. Today 158 (2010) 459-463.
Wang et al., Mass production of micro/nanostructured porous ZnO plates and their strong structurally enhanced and selective adsorption performance for environmental remediation, J. Mater. Chem. 20 (2010) 8582-8590.
Cao et al., "Ceria hollow nanospheres produced by a template-free microwave-assisted hydrothermal method for heavy metal ion removal and catalysis," J. Phys. Chem. C 114 (2010) 9865-9870.
Recillas et al., Chromium VI adsorption on cerium oxide nanoparticles and morphology changes during the process, J. Hazard. Mater. 184 (2010) 425-431.
International Search Report for International Application No. PCT/AU2016/050417, dated Jul. 1, 2016, 4 pages.
Written Opinion for International Application No. PCT/AU2016/050417, dated Jul. 1, 2016, 5 pages.
Kabiri et al. "Graphene-Diatom Silica Aerogels for Efficient Removal of Mercury Ions from Water", ACS Applied Materials & Interfaces, Apr. 2, 2015, vol. 7, pp. 11815-11823.

(56) References Cited

OTHER PUBLICATIONS

Yang et al. "Magnetic graphene foam for efficient adsorption of oil and organic solvents", Journal of Colloid and Interface Science, Jun. 9, 2014, vol. 430, pp. 337-344.
Andjelkovic et al., "Graphene Aerogels Decorated with α-FeOOH Nanoparticles for Efficient Adsorption of Arsenic from Contaminated Waters", ACS Applied Materials and Interfaces, 2015, vol. 7, pp. 9758-9766.
Nelson et al., Mercury Sources, Transportation and Fate in Australia, Final Report to DEWHA, Dec. 2009, 183 pages.
Mersorb Mercury Adsorbents, Design and Performance Characteristics, Nucon International, Inc.—Mersorb Bulletin 11B28-2010, 27 pages.
Mersorb LW mercury adsorbent proven technology & products—Selective Adsorption Associates, 2012, 2 pages.
UOP Mercury Removal for Natural Gas Production, UOP adsorbent solutions help prevent mercury contamination, UOP A Honeywell Company, Oct. 2011, 4 pages.

* cited by examiner

COMPOSITE GRAPHENE-BASED MATERIAL

CROSS REFERENCE TO RELATED APPLICATION

This application is the National Stage of International Application No. PCT/AU2016/050417, filed May 27, 2016, which claims the benefit of Australian Patent Application No. 2015902012, filed May 29, 2015, the contents of each are herein incorporated by reference in their entireties.

FIELD OF THE INVENTION

The present invention relates in general to composite materials, and in particular to a composite material having a porous graphene-based foam matrix. The composite material is particularly well suited for use in removing ionic species from a liquid or gas. Accordingly, it will be convenient to describe the invention with an emphasis toward that application. However, it is to be understood that the composite material maybe used in various other applications.

BACKGROUND OF THE INVENTION

Pollution of water and air by ionic species, such as heavy metal ions, has long been and continues to be a serious environmental concern for modern day society. For example, industrial waste waters and mine drainage are often contaminated with toxic ionic species that should be removed before the water is released to the environment. Similarly, industrial flue, combustion and exhaust gases contaminated with toxic ionic species should be scrubbed before the gas in vented to the atmosphere. Various methods such as precipitation, coagulation-flocculation, chelation, ion exchange, scrubbing, reverse osmosis and adsorption have been investigated for removing ionic species from ion contaminated liquids and gases.

On an industrial scale, the removal of toxic ionic species from polluted liquid is commonly achieved by precipitation. However, this technique requires long interaction time and high cost materials to facilitate the formation of insoluble compounds (derived from the ionic species) which are collected and disposed. It can also be difficult to reduce the concentration of target ionic species to very low levels by precipitation.

Ion exchange has also been employed with some success for removing ionic species from contaminated liquids. This technique conventionally involves passing the liquid to be decontaminated through packed bed or column of ion exchange resin. Target ionic species are removed from the liquid by undergoing ion exchange with more benign ionic species that form part of the resin.

In some applications ion exchange can be preferable to precipitation because if enables the ionic contaminant to be recovered in the form of a liquid concentrate that potentially can be recycled. However, ion exchange resins can be expensive and their manufacture typically makes use of rather toxic raw materials and presents its own environmental concerns.

Flue, combustion or exhaust gases/contaminated with toxic ionic species are conventionally scrubbed to remove the ions using wet scrubbing techniques. This typically involves passing the gas (before being vented to the atmosphere) through chemical solutions to facilitate the formation of insoluble compounds (derived from the ionic species) which are then collected and disposed. The technique is therefore prone to similar problems to those outlined above. Reducing the concentration of target ionic species in the gas to very low levels can be particularly difficult.

Techniques using adsorption/absorption materials are emerging as the most promising area for efficient and effective removal of target species (such as ionic species or organic compounds) from liquids and gases. Numerous synthetic and natural porous materials have been explored and commercially used in that regard. For example, synthetic silica mesoporous materials are perhaps the most successful adsorbents for ionic species on the market. Polymer foams have also been used as absorbents for removing oil from water. However, these adsorbents/absorbents are typically very expensive and their production also involves the use of toxic raw materials which presents its own environmental concerns. The adsorbents/absorbents also often do not exhibit versatility in being suitable for removal of different target species from liquids and gases.

Accordingly, there remains an opportunity to develop new materials suitable for use in facilitating removal of a diverse range of target species from liquids and gases which overcome one or more problems associated with materials and techniques currently employed.

SUMMARY OF THE INVENTION

The present invention therefore provides a composite material having a porous graphene-based foam matrix and comprising porous inorganic micro-particles and metal oxide nano-particles distributed throughout the foam matrix.

It has now surprisingly been found that composite material in accordance with the invention exhibits excellent properties for removing a range of species (e.g. ionic and organic species) from liquids and gases. For example, the composite material can demonstrate high selectivity and efficiency for removing heavy metal ions from liquid or gas.

Composite material in accordance with the invention surprisingly and advantageously exhibits at least improved adsorption capacity of ionic species relative to the individual components that make up the composite material and also other commercially available adsorbent materials. Without wishing to be limited by theory, it is believed the unique combination of materials having different size parameters that form the composite material provides for a synergistic relationship that imparts to the composite material unique properties such as an ion adsorption capacity greater than that of the components of the composite material in isolation.

The composite materials have also been found to be very versatile in that they can be advantageously tailored to facilitate removal of organic species from liquids or gases In one embodiment, a surface of the composite material is functionalised with one or more of sulfur-containing, phospho-containing functional groups, nitrogen-containing and oxygen-containing functional groups.

Providing the composite material with one or more of sulfur-containing, phospho-containing functional groups, nitrogen-containing, and oxygen-containing functional groups has advantageously been found to further enhance the ion adsorption capacity and/or ion selectivity of the composite material. The presence of these functional groups can also modify the adsorption capacity and/or selectivity of the composite towards organic species.

The present invention further provides a method of preparing composite material having a porous graphene-based foam matrix and composing porous inorganic micro-particles and metal oxide nano-particles distributed throughout the foam matrix, the method comprising:

(i) providing a liquid dispersion comprising dispersed (a) graphene-based material, (b) porous inorganic micro-particles, and (c) metal oxide nano-particles;

(ii) forming a gel from the liquid dispersion; and (iii) forming the composite material by removing liquid from the gel.

In one embodiment, the method according to the invention also comprises functionalising a surface of the so formed composite material with one or more of sulfur-containing, nitrogen-containing, phospho-containing functional groups, and oxygen-containing functional groups.

In a further embodiment of the method according to the invention, the liquid dispersion is prepared by a process comprising introducing to a liquid pre-formed metal oxide nano-particles.

In another embodiment of the method according to the invention, the liquid dispersion is prepared by a process comprising introducing to a liquid a metal oxide nano-particle precursor, wherein the metal oxide nano-particle precursor is converted in situ to form metal oxide nano-particles.

In yet a further embodiment of the method according to the invention, the liquid dispersion is prepared by a process comprising introducing to a liquid pre-formed metal oxide nano-particles and a metal oxide nano-particle precursor, wherein the metal oxide nano-particle precursor is converted is situ to form metal oxide nano-particles.

The method according to the present indention can advantageously give rise to composite material exhibiting robust physical properties and high surface area. Without wishing to be limited by theory, it is believed a unique interaction occurs between the components in the dispersion and upon formation of the gel and removal of the liquid to form the composite material the so formed graphene-based foam matrix is provided with high surface area and a substantially uniform distribution of the porous inorganic micro-particles and metal oxide nano-particles throughout the foam matrix.

While the composite material in accordance with the invention may find use in various applications, it has been found to be particularly suitable for use in removing target species such as ions or organic molecules from a liquid or gas. For example, the composite material is well suited for removing heavy metal ions from as aqueous solution or flue, combustion or exhaust gases.

The present invention therefore also provides a method of removing a target species from a liquid or gas, the method comprising contacting at least the target species with the composite material according to the present invention.

In one embodiment, the target species are ions or organic molecules.

In one embodiment, the ions are heavy or precious metal ions and the liquid is an aqueous liquid. In that case, the method may be described as a method of removing heavy metal or precious ions from an aqueous liquid, the method comprising contacting at least the heavy metal or precious ions with the composite material according to the present invention.

In another embodiment, the ions are heavy or previous metal ions and the gas is a flue, combustion or exhaust gas. In that case, the method may be described as a method of removing heavy metal or precious ions from a flue, combustion or exhaust gas, the method comprising contacting at least the heavy metal or precious ions with they composite material according to the present invention.

In one embodiment, the organic molecules are hydrocarbons and the liquid is an aqueous liquid. In that case, the method may be described as a method of removing hydrocarbons from an aqueous liquid, the method comprising contacting at least the hydrocarbons with the composite material according to the present invention.

In another embodiment, organic molecules are hydrocarbons and the gas is a flue, combustion or exhaust gas. In that case, the method may be described as a method of removing hydrocarbons from a flue, combustion or exhaust gas, the method comprising contacting at least the hydrocarbons with the composite material according to the present invention.

Through adaptation of functional groups presented on the surface of the composite material, the composite material advantageously be tailored to exhibit selectivity of target species removal. For example, the surface of the composite material may be presented with sulfur-containing functional groups which have a high affinity for binding with ions of mercury, lead, gold, silver and copper.

Target species that removed from the liquid of gas become adsorbed onto or absorbed within the composite material. The target species can then be isolated from the composite material via desorption for recycling or disposal.

The present invention also provides a composite material having a porous graphene-based foam matrix and comprising porous inorganic micro-particles and metal oxide nano-particles distributed throughout the foam matrix, wherein a target species (e.g. ion or organic molecule) is adsorbed onto or absorbed within the composite material.

Further aspects and embodiments of the inversion are discussed in more detail below.

BRIEF DESCRIPTION OF THE DRAWINGS

The invention will herein be described with reference to the following non-limiting drawings in which.

DETAILED DESCRIPTION OF THE INVENTION

Figure 1:
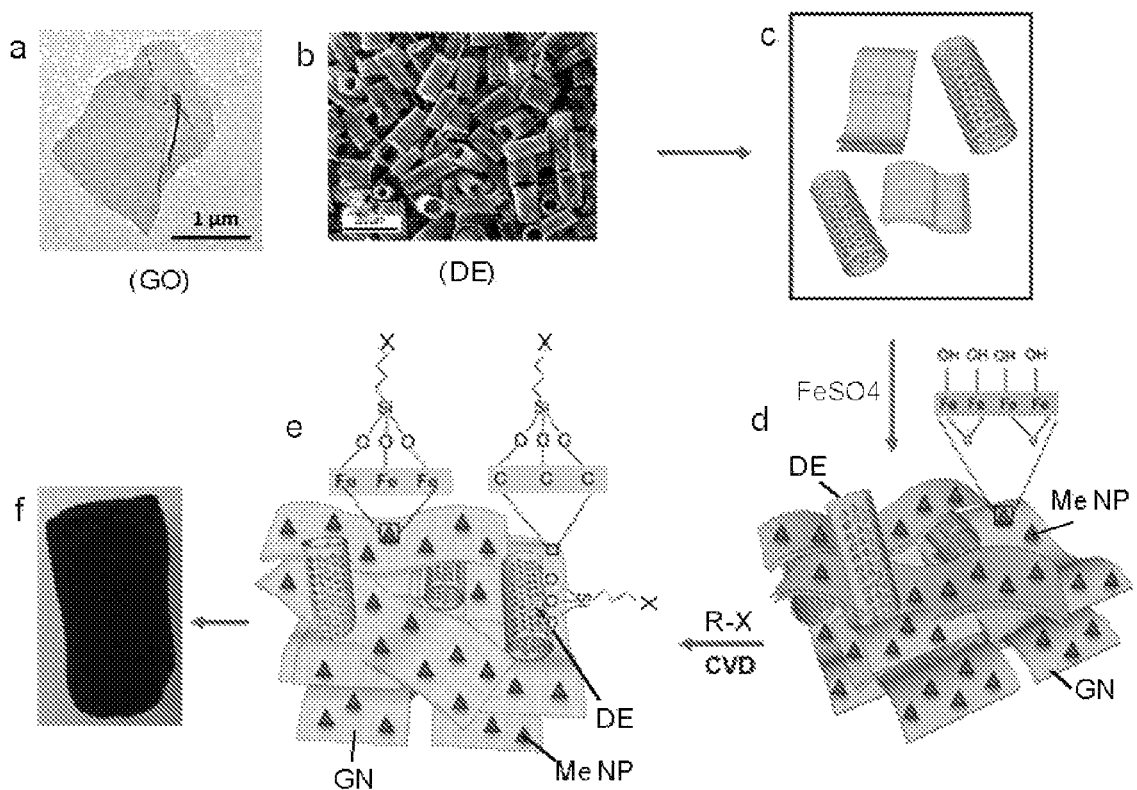
FIG. 1 illustrates a schematic of the synthetic process for preparation of graphene-based composite materials, a) transmission electron microscopy (TEM) image of typical structure of graphene oxide (GO) nanosheets, (b) scanning electron microscopy (TEM diatom silica porous micro-particles from diatomaceous earth (DE), (c) the scheme of reduction process of GO to reduced graphene oxide or graphene using reducing agent and in-situ formation of nano-particles metal oxide (eg. αFeOOH nanoparticles) in the form of hydrogel composite followed by formation of 3-d aerogel composite by freeze drying process, e) scheme of graphene-DE-αFeOOH aerogel functionalisation with MPTMS using chemical vapour deposition (CVD) to obtain (f) final thiol-functionalised GN-DE αFeOOH-MPTMS aerogel (GN-DE-SH) with unique 3-architecture, porosity, and composition (graphene, DE micro-particles, iron oxide nano-particles all modified with specific functional groups to bind specific ions or molecules.

The present invention provides a composite material having a porous graphene-based foam matrix, porous inorganic micro-particles and metal oxide nano-particles distributed throughout the foam matrix.

Reference herein to the "composite material" is meant a material that presents as a three dimensional monolithic structure made from at least three constituent components, namely the graphene-based foam matrix, the porous inorganic micro-particles and the metal oxide nano-particles.

There is no particular limitation regarding the size or shape in which the composite material is provided. As will be discussed in more detail below, the composite material may be readily produced in a diverse range of three dimensional shapes and sizes.

Depending on the intended application for the composite material, it may be desirable for the composite material to present on its surface specific functional groups. Such specific functional groups may be located on the surface of any of the constituent component of the composite material Those skilled in the art will appreciate the graphene-based material such as graphene oxide and reduced graphene oxide, together with the porous inorganic micro-particles and metal oxide nano-particles, may inherently present functional groups such as oxygen-containing functional groups at their surface. Accordingly, if the composite material or its constituent components have not been subject to surface modification, the "as formed" composite material may in any event have a surface replete with relevant functional groups, for example oxygen-containing functional groups (such as OH-containing functional groups).

As will be discussed in more detail below, if required the composite material can be provided with a surface that presents or is functionalised with sulfur-containing functional groups, oxygen-containing functional groups, phospho-containing functional groups, nitrogen-containing functional groups or a combination thereof.

In one embodiment, the composite material comprises a surface functionalised with sulfur-containing functional groups oxygen-containing functional groups, phospho-containing functional groups, nitrogen-containing functional groups or a combination thereof.

In one embodiment, the sulphur-containing functional groups comprise a thiol (—SH) group.

In another embodiment, the nitrogen-containing functional groups comprise an amine group, a quaternary ammonium group or a combination thereof.

In a further embodiment, the composite material comprises a surface modified or functionalised with an amino silane compound. An example of suitable amino silane compound includes (3-aminopropyl)trimethoxy silane (APTMS).

In another embodiment, the composite material comprises a surface modified or functionalised with a thio silane compound. An example of suitable thio silane compound includes (3-mercaptopropyl)trimethoxy silane (MPTMS).

In a further embodiment, the composite material comprises a surface modified or functionalised with a chelating agent. Examples of suitable chelating agents include N-(trimethoxysilylpropyl) ethylenediamine triacetic acid (EDTA-silane) and N-(trimethoxysilylpropyl)diethylene triamine pentaacetic acid (DPTA-silane).

In yet a further embodiment, the composite material comprises a surface modified or functionalised with a polymer. Examples of suitable polymers include those comprising nitrogen-containing functional groups (e.g. chitosan).

In another embodiment, the composite material comprises a surface modified of functionalised with one or more of an amino sliane compound, a thio silane compound, a chelating agent, and a polymer.

An important feature of the composite material according to the invention is its porous graphene-based foam matrix.

Graphene is an allotrope of carbon having a one atom thick planar sheet structure of typically $sp^2$-bonded carbon atoms that are densely packed in a honeycomb 2D crystal lattice. The covalently bonded carbon atoms typically form repeating units that comprise 6-membered rings, but can also form 5-membered rings and/or 7-membered rings. A layer of such covalently bonded carbon atoms is commonly referred to as a graphene "sheet". Graphene may be prepared by exfoliation of graphite.

Graphene oxide is an oxygenated form of graphene that is typically prepared by exfoliation of graphite oxide. Graphene oxide is considered to have a graphene-based structure that is substituted with oxygenated groups such as hydroxyl and epoxide. Graphene oxide may be prepared using a number of techniques such as the so called Brodie, Staudenmaier or Hummers methods.

Graphene oxide may be reduced so as to form reduced graphene oxide. Reduced graphene oxide is both chemically and physically different to graphene oxide due to the loss of its oxygenated groups. The degree to which graphene oxide is reduced can be varied, with that variation being reflected in the amount of oxygenated groups remaining. Reduced graphene oxide is less hydrophilic than graphene oxide. Reduced graphene oxide is often referred to in the art simply as graphene as an indication that substantially all oxygenated groups have been removed. Techniques for reducing graphene oxide are well known in the art. For example, graphene oxide can be reduced by chemical or thermal reduction.

Graphene oxide and reduced graphene oxide have a covalently bonded carbon atom sheet structure similar to graphene.

In the context of the present invention the expression "graphene-based" foam matrix is therefore intended to mean the foam matrix has a structure made of graphene oxide, reduced graphene oxide, graphene or a combination of two or more thereof. The expression "graphene-based" may therefore be used herein as a convenient reference to graphene (material or sheets), graphene oxide (material or sheets), reduced graphene oxide (material or sheets) or a combination of two or more thereof.

In one embodiment, the composite material (i) has a porous graphene-based foam matrix comprising reduced graphene oxide, and (ii) comprises porous inorganic inorganic micro-particles and metal oxide nano-particles distributed throughout the foam matrix.

Those skilled in the art will be familiar with conventional porous graphene-based foam structures. For example, graphene aerogels and xerogels are well known porous graphene-based foam structures.

In one embodiment, the porous graphene-based foam matrix is in the foam of an aerogel or a xerogel.

Reference herein to an "aerogel" or "xerogel" is intended to describe an open-cell porous foam network that is formed by the removal of liquid from a hydrogel or an organogel. In the context of the present invention, reference to the porous graphene-based foam matrix its the form of an aerogel or xerogel is therefore intended to be that defined by a porous graphene-based foam matrix formed upon removal of liquid from a graphene-based hydrogel or organogel. Those skilled in the art will appreciate that the morphology of an aerogel or xerogel mirrors or is templated from the hydrogel or organogel item which it is derived.

By the graphene-based foam being "porous" is meant that foam has a structure or matrix comprising pores, holes or voids that present as a collection of interconnected cells. Such cells are "open cells" in the sense that they provide for the porous nature of the foam and are interconnected such that they form a network and allow liquid or gas to pass through the cell structure or matrix that makes up the foam.

The composite material may therefore be described as having a porous graphene-based open cell foam matrix.

The "matrix" of the foam represents features that define the cell structure of the foam and provide for structural integrity of the foam. The matrix comprises graphene-based material as outlined herein that defines cell walls of the foam.

Provided the foam is porous, there is no particular limitation regarding the morphology of the foam matrix that provides for that porosity.

The porous morphology of the graphene-based foam provides the composite material with a high surface area, which in turn assist with providing the composite material with high adsorption or absorption capacity.

The composite material may have a surface area ranging from about 300 to about 900 m$^2$/g.

Reference herein to surface area is that which is measured using the methylene blue (MB) adsorption method by UV-vis spectroscopy. According to that method, a known mass of the composite material is added into a known volume of MB standard-solution. The mixed suspension is sonicated for 2-3 hours and stirred continuously for 24 hours to reach the adsorption-desorption equilibrium. A few millilitres of the mixture is collected and then centrifuged to remove the suspended materials. The MB concentration is determined by analysing the supernatant through UV-vis spectroscopy at a wavelength of 665 nm. The specific surface area of the material is then calculated using equation (1) below:

$$SSA = \frac{N_A A_{MB}}{M_{MB}} \frac{(C_0 - C_e)V}{m_s} \quad (1)$$

where $N_A$ represents Avogadro number ($6.02 \times 10^{23}$/mol), $A_{MB}$ is the covered area of per MB molecules (1.35 nm$^2$), $C_0$ and $C_e$ are the initial and equilibrium concentration of MB, respectively, V is the volume of MB solution, $M_{MB}$ is the relative molecular mass of MB, and $m_s$ is the mass of the sample.

By visualising the porous graphene-based foam as being made up of interconnected open cells, the cells can be seen to define a pore, hole or void in the foam structure. Such pores will define a pore size.

Reference to a "pore size" herein is intended to mean the distance presented by the diameter of a cross-section of a given cell. As a cross-sectional shape of a given cell may not be circular, reference to the cross-sectional "diameter" is intended to mean the largest cross-sectional distance between the cell walls. As there may be variation in pore size, it will often be more appropriate to refer to the average pore size.

Accordingly, in one embodiment the porous graphene-based foam matrix comprises open cells that define an average pore size ranging from about 100 nm to about 50 μm, or from about 200 nm to about 5 μm.

The porous graphene-based foam matrix may be described as defining an interconnected network of open cell walls, with the cell walls comprising graphene-based sheets.

The porous graphene-based foam matrix may comprise a surface functionalised with sulfur-containing functional groups, oxygen-containing functional groups, phospho-containing functional groups, nitrogen-containing functional groups or a combination thereof.

In one embodiment, a surface of the porous graphene-based foam matrix comprises sulfur-containing functional groups, oxygen-containing functional groups, phospho-containing functional groups, nitrogen-containing functional groups or a combination thereof.

In a further embodiment, a surface of the porous graphene-based foam matrix is modified or functionilised with an amino silane compound. An example of suitable amino silane compound includes (3-aminopropyl) trimethoxy silane (APTMS).

In another embodiment, a surface of the porous graphene-based foam matrix is modified or functionalised with a thio silane compound. An example of suitable thio silane compound includes (3-mercaptopropyl)trimethoxy silane (MPTMS).

In a further embodiment, a surface of the porous graphene-based foam matrix is modified or functionalised with a chelating agent. Examples of suitable chelating agents include N-(trimethoxysilylpropyl) ethylenediamine triacetic acid (EDTA-silane) and N-(trimethoxysilylpropyl)diethylene triamine pentaacetic acid (DPTA-silane).

In yet a further embodiment, a surface of the porous graphene-based foam matrix is modified of functionalised with a polymer. Examples of suitable polymers include those comprising nitrogen-containing functional groups (e.g. chitosan).

In addition to having a porous graphene-based foam matrix, the composite material in accordance with the invention comprises porous inorganic micro-particles and metal oxide nano-particles distributed throughout the foam matrix.

Reference herein to "porous inorganic" micro-particles is intended to mean naturally occurring or synthetic inorganic materials having a porous matrix or structure. Such materials may be silica-based or aluminosilicate-based porous mineral micro-particles.

By the inorganic micro-particles being "porous" is meant that it has with in its structure pores, holes or voids much in the same way as the foam matrix described herein. Such pores will define a pore size and the pores allow for gas or liquid to pass through the inorganic material.

In one embodiment, the porous inorganic micro-particles comprise or are made of silica or aluminosilicate.

Examples of suitable porous inorganic micro-particles for use in accordance with the invention include those comprising or made of diatomaceous earth, zeolites, silica, titania, clays carbonates, magnetite, alumina, titania, ZnO, $SnO_2$, $ZrO_2$, MgO, CuO, $Fe_2O_3$, $Fe_3O_4$ or combinations thereof.

A combination of two or more different porous inorganic micro-particles may be present/used.

There is no particular limitation regarding the shape of the porous inorganic micro-particles. For example, they may have a spherical, rod or plate like shape.

There is no particular limitation regarding the pore size presented by the porous inorganic micro-particles. Generally, the porous inorganic micro-particles will have an average pore size ranging from about 10 nm to about 50 nm.

By the porous inorganic particles being "micro-particles" is means that at least one dimension of the particles is greater than 1 μm, for example from greater than 1 μm to about 30 μm. In one embodiment, all dimensions of the micro-particles range in size from greater than 1 μm to about 30 μm.

The porous inorganic micro-particles will typically be adhered or bound to the surface of the foam matrix. Adherence of the porous inorganic micro-particles to the surface of the foam matrix may be through chemical means, physical means or a combination thereof. For example, them may be electrostatic interaction or covalent bonds between functional groups present on the surface of the porous inorganic micro-particles and the surface of the foam matrix, and/or graphene-based sheets that form the foam matrix may physically trap or lock in the porous inorganic micro-particles into the foam matrix.

Those skilled in the art will appreciate that the surface of certain porous inorganic micro-particles (e.g. mineral particles) may be replete with oxygen-containing function group such as —OH. To at least facilitate incorporation, distribution and/or adherence of the inorganic micro-particles within the foam matrix, the surface functionality of the particles may be modified. As will be discussed in more detailed below in the context of the method of preparing the composite material, a surface of the inorganic micro-particles may be modified with, for example, sulfur-containing functional groups, oxygen-containing functional groups, phospho-containing functional groups, nitrogen-containing functional groups or a combination thereof.

In one embodiment, a surface of the porous: inorganic micro-particles comprises sulfur containing functional groups, oxygen-containing functional groups, phospho-containing functional groups, nitrogen-containing functional groups or a combination thereof.

In a further embodiment, a surface of the porous inorganic micro-particles is modified or functionalised with an amino silane compound. An example of suitable amino silane compound includes (3-aminopropyl) trimethoxy silane (APTMS).

In another embodiment, a surface of the porous inorganic micro-particles is modified or functionalised with a thio silane compound. An example of suitable thio silane compound includes (3-mercaptopropyl) trimethoxy silane (MPTMS).

In a further embodiment a surface of the porous inorganic micro-particles is modified or functionalised with a chelating agent. Examples of suitable chelating agents include N-(trimethoxysilylpropyl) ethylenediamine triacetic acid (EDTA-silane) and N-(trimethoxysilylpropyl)diethylene triamine pentaacetic acid (DPTA-silane).

In yet a further embodiment, a surface of the porous inorganic micro-particles is modified or functionalised with a polymer. Examples of suitable polymers include those comprising nitrogen-containing functional groups (e.g. chitosan).

Provided the composite material in accordance with the invention can be formed, there is no particular limitation regarding the amount of porous inorganic micro-particles that can be incorporated into the composite material. Generally, the composite material will comprise from about 20 to about 80 wt % of porous inorganic micro-particles.

In one embodiment, the ratio of graphene-based material to porous inorganic micro-particles present within the composite material ranges from about 6:1 to about 3:1 (based on mass).

The composite material also comprises metal oxide nano-particles distributed throughout the foam matrix.

In a similar manner to the porous inorganic micro-particles, the metal oxide nano-particles will typically be adhered or bound to the surface of the foam matrix. Again, adherence of the metal oxide nano-particles to the surface of the foam matrix may be through chemical means, physical means or a combination thereof. For example, there may be an electrostatic interaction or covalent bond between function groups present on the surface of the metal oxide nano-particles and the surface of the foam matrix, and/or graphene-based sheets that form the foam matrix may physically trap or lock the metal oxide nano-particles into the foam matrix. Furthermore the metal oxide nano-particles may also be adhered to the surface of the porous inorganic micro-particles in a similar manner.

The metal oxide nano-particles used in accordance with the invention will typically be selected having regard to the intended application of the composite material. For example, where the composite material is to be used for removing ions from liquid or gas, the metal oxide nano-particles may be selected having regard to their adsorption properties toward the ions to be removed.

In one embodiment the metal oxide nano-particles are selected from oxides of iron, manganese, aluminium, titanium, zinc, gold, silver, copper, lithium, manganese, magnesium, cerium and combinations thereof.

In one embodiment, the metal oxide nano-particles are iron oxide particles.

In a further embodiment the iron oxide is selected from goethite ($\alpha$-FeOOH), hematite ($\alpha$-$Fe_2O_3$), amorphous hydrous Fe oxides, maghemite ($\gamma$-$Fe_2O_3$), magnetite ($Fe_3O_4$) and iron/iron oxide ($Fe@Fe_xO_y$).

In another embodiment, the metal oxide is an aluminium oxide.

In one embodiment, the aluminium oxide is selected from $\alpha$-$Al_2O_3$ or $\gamma$-$Al_2O_3$.

In another embodiment, the metal oxide is a zinc oxide. The zinc oxide may be in the form of nano-flowers or nano-rods.

A combination of two or more metal oxide nano-particles may be incorporated within the composite material.

As used herein, the expression "nano-particles" is intended to mean panicles having at least one dimension that is less than 100 nm. In one embodiment, all dimensions of the metal oxide nano-particles are less than 100 nm.

Provided the composite material can be formed, there is also no limit on the amount of metal oxide nano-particles that can be incorporated. Generally, the metal oxide nano-particles will be present in the composite material in an amount ranging from about 5 to about 35 wt %.

The composite material in accordance with the invention can advantageously be prepared to exhibit a variety of densities, including very low density.

In one embodiment, the density of the composite material ranges from about 0.01 $mg/cm^3$ to about 0.1 $mg/cm^3$.

As referred to herein, the density of the composite material is determined by conventional mass and volume measurements.

Depending upon the intended application for the composite material, it can be desirable for the composite material to exhibit a particular zeta potential. For example, where the composite material is employed in the removal of ionic species such as cations, it may be preferable for the composite material to exhibit a negative zeta potential.

In one embodiment, the composite material has a negative zeta potential. For example, the negative zeta potential may range from less than 0 mV to about −20 mV.

The method for preparing the composite material in accordance with the invention comprises providing a liquid dispersion comprising dispersed (a) graphene-based material, (b) porous inorganic micro-particles, and (c) metal oxide nano-particles.

The liquid dispersion may be an organic liquid dispersion or an aqueous liquid dispersion. By an "organic" liquid dispersion is meant that the liquid content of the dispersion comprises greater than 50 volume percent of organic solvent. By an "aqueous" liquid dispersion is meant that the liquid content of the dispersion comprises greater than 50 volume percent of water.

By being a liquid "dispersion" is meant that throughout a liquid media is presented a distribution of components that are insoluble in the liquid media. In the context of the present invention, the graphene-based material, the porous inorganic micro-particles and the metal oxide nano-particles are distributed or dispersed throughout a liquid media.

Examples of liquid media that may be used to provide for the liquid dispersions according to the invention include water, methanol, ethanol, dimethylformamide (DMF), N-methyl-2-pyrrolidone (NMP), acetone, dimethylsulfoxide (DMSO), and combinations thereof.

Those skilled in the art will have a sound understanding of preparing dispersions comprising constituent components of the type described herein.

Generally, the liquid dispersion will be prepared by bringing a liquid into contact with the graphene-based material, the porous inorganic micro-particles and pre-formed metal oxide nano-particles and/or a metal oxide nano-particle precursor. Bringing the liquid into "contact" with these components will in practice typically mean that the liquid is combined, mixed or stirred with these components.

As noted, the liquid dispersion may be prepared using techniques and equipment well known to those skilled in the art.

Formation of the dispersion may be facilitated by subjecting the components of the dispersion to sonication.

The process of preparing the dispersion comprises contacting a liquid with the graphene-based material. Suitable graphene-based materials are described herein.

When the liquid dispersion is an aqueous liquid dispersion it will be generally preferred that the graphene-based material exhibits at least some hydrophilic character. In that case, the graphene-based material will generally be graphene oxide.

In one embodiment, the method comprises providing an aqueous liquid dispersion comprising dispersed (a) graphene-based material comprising graphene oxide, (b) porous inorganic micro-particles, and (c) metal oxide nano-particles.

To facilitate dispersion of the porous inorganic microparticles in the selected liquid medium, it may be desirable to modify the surface of the porous inorganic micro-particles.

In one embodiment, the liquid dispersion is prepared by a process comprising bringing the porous inorganic micro-particles into contact with a liquid. In a another embodiment, the method further comprises a step of modifying surface functional groups of the porous inorganic nano-particles before the particles are contacted with the liquid.

Modifying surface functional groups of the porous inorganic micro-particles may be performed by reacting surface functional groups on the porous inorganic micro-particles with one or more compounds.

In one embodiment, surface functional groups of the porous inorganic micro-particles are modified by a silanization process. In a further embodiment, the silanization process comprises reacting the porous inorganic micro-particles with an amino or thio silane compound, such as APTMS or MPTMS.

To provide the dispersion with dispersed metal oxide nano-particles, the liquid dispersion may be prepared by a process comprising contacting a liquid with pre-formed metal oxide nano-particles.

The metal oxide nano-particles can advantageously be pre-formed using techniques, reagents and equipment known to those skilled in the art. For example, the preparation of various metal oxide particles is disclosed in Y. H. Chen, F. A. Li, Kinetic study on removal of copper (II) using goethite and hematite nano-photocatalysts, J. Colloid Interface Sci. 347 (2010) 277-281; M. Fan, T. Boonfueng, Y. Xu, L. Axe, T. A. Tyson, Modeling Pb sorption to microporous amorphous oxides as discrete particles and coatings, J. Colloid Interface Sci. 281 (2005) 39-48; J. Hu, G. H. Chen, I. M. C. Lo, Removal and recovery of Cr (VI) from wastewater by maghemite nanoparticles, Water Res. 39 (2005) 4528-4536; J. Hu, G. H. Chen, I. M. C. Lo, Selective removal of heavy metals from industrial wastewater using maghemite nanoparticle; Performance and mechanisms, J. Environ. Eng.-ASCE. 132(2006) 709-715; Q. Su, B. C. Pan, S. L. Wan, W. M. Zhang, L. Lv, Use of hydrous manganese dioxide as a potential sorbent for selective removal of lead, cadmium, and zinc ions from water, J. Colloid Interlace Sci. 349 (2010) 607-612; R. Koivula, J. Pakarinen, M. Sivenius, K. Sirola, R. Harjula, E. Paatero, Use of hydrometallurgical wastewater as a precursor for the synthesis of cryptomelane-type manganese dioxide ion-exchange material. Sep. Purif. Technol. 70 (2009) 53-57; J. Pakarinen, R. Koivula, M. Laatikainen, K. Laatikainen, E. Paatero, R. Harjula, Nanoporousmanganese oxides as environmental protective materials—effect of Ca and Mg on metals sorption, J. Hazard. Mater. 180 (2010) 234-240; P. Liang. T. Q. Shi J. Li, Nanometer-size titanium dioxide separation/preconcentration and FAAS determination of trace Zn and Cd in water sample, Int. J. Environ. Anal. Chem. 84 (2004) 315-321; K. E. Engates, H. J. Shipley, Adsorption of Pb, Cd, Cn, Zn, and Nito titanium dioxide nanoparticles: effect of particle size, solid concentration, and exhaustion. Environ. Sci. Pollut. Res. 18 (2011) 386-393; Y. I. Tarasevich, G. M. Klimova, Complex-forming adsorbents based on kaolinite, aluminium oxide and polyphosphates for the extraction and concentration of heavy metal ions from water solutions, Appl. Clay Sci. 19 (2001) 95-101; X. L. Pu, Z. C. Jiang, B. Hu, H. B. Wang, Gamma-MPTMS modified nanometer sized alumina micro-column separation and preconcentration of trace amounts of Hg, Cu Au and Pd in biological, environmental and geological samples and their determination by inductively coupled plasma mass spectrometry, J. Anal. Atom. Spectrom. 19 (2004) 984-989; A. Afkhami, M. Saber-Tehrani, H. Bagheri, Simultaneous removal of heavymetal ions in wastewater samples using nano-alumina modified with 2,4-dinitrophenylhydrazine, J. Hazard. Mater. 181 (2010) 836-844; X. F. Ma, Y. Q. Wang, M. J. Gao, H. Z. Xu, G. A. Li. A novel strategy to prepare ZnO/PbS heterostructured functional nanocomposite utilizing the surface adsorption property of ZnO nanosheets. Catal. Today 158 (2010) 459-463; X. B. Wang, W. P. Cai, Y. X. Lin, G. Z. Wang, C. H. Liang, Mass production of micro/nanostructured porous ZnO plates and their strong structurally enhanced and selective adsorption performance for environmental remediation, J. Mater. Chem. 20 (2010) 8582-8590; C. Y. Cao, Z. M. Cui, C. Q. Chen, W. G. Song, W. Cai, Ceria hollow nanospheres produced by a template-free microwave-assisted hydrothermal method for heavy metal ion removal and catalysis, J. Phys. Chem. C114 (2010) 9865-9870; and S. Recillas, J. Colon, E. Casals, E. Gonzalez, V. Puntes, A. Sanchez, X. Font, Chromium VI adsorption on cerium oxide nanoparticles and morphology changes during the process, J. Hazard. Mater. 184 (2010) 425-431.

The liquid dispersion may also be prepared by a process comprising introducing to a liquid a metal oxide nano-particle precursor, wherein the metal oxide nano-particle precursor is converted in situ to form metal oxide nano-particles. In other words, instead of pre-forming the metal oxide nano-particles and then contacting them with the liquid in preparing the dispersion, the metal oxide nano-particles can be conveniently prepared in situ during the actual process of preparing the dispersion.

Those skilled in the art will be able to readily adopt known techniques for preparing metal oxide nano-particles so as to form them in situ during preparation of the dispersion.

Reference herein to a "metal oxide nano-particle precursor" is intended to mean one or more compounds that undergo a chemical reaction or transformation so as to form metal oxide nano-particles. Examples of metal oxide nano-particle precursors include $Fe(NO_3)_3$, $FeCl_3$, $FeSO_4$, $Mn(NO_3)_2$, $AgNO_3$, $Zn(NO_3)_2$, $NaMnO_4$, $MnSO_4$, AuCl and $Al(NO_3)_3$.

By the metal oxide nano-particle precursor being converted "in situ" to form metal oxide nano-particles is meant that the one or more metal oxide nano-particle precursor compounds undergo a chemical reaction or transformation within the liquid being used to prepare the liquid dispersion so as to form the metal oxide nano-particles. By forming the metal oxide nano-particles in this way it has been found that the resulting nano-particles are well distributed throughout the resulting foam matrix.

In one embodiment, the liquid dispersion is prepared by a process comprising contacting the graphene-based material and the porous inorganic micro-particles with a liquid to form an intermediate dispersion and then contacting the so formed intermediate dispersion with the metal oxide nano-particle precursor, wherein the metal oxide nano-particle precursor is converted in situ to form metal oxide nano-particles.

By first forming an intermediate dispersion comprising the liquid, the graphene-based material and the porous inorganic micro-particles, and then contacting it with the metal oxide nano-particle precursor. It has been found that metal oxide nano-particles can be formed such that they are not only well distributed throughout the foam matrix but also adhered to both the graphene-based material and the porous inorganic nano-particles.

To facilitate conversion of the metal oxide nano-particle precursor into metal oxide nano-particles it may be necessary to introduce one or more other reagents into the liquid. For example, the conversion of the metal oxide nano-particle precursor into metal oxide nano-particles may take place in an acidic or basic pH environment.

By an "acidic" pH is meant a pH less than 7.0. By a "basic" pH is meant a pH greater than 7.0.

In one embodiment, the liquid dispersion is an aqueous liquid dispersion, and the aqueous liquid dispersion is prepared by a process comprising contacting an aqueous liquid with graphene-based material and porous inorganic micro-particles so as to form an intermediate dispersion, contacting the so formed intermediate dispersion with metal oxide nano-particle precursor, and adjusting the pH of the so formed liquid, for example to an acidic pH, wherein the metal oxide nano-particle precursor is converted in situ to form metal oxide nano-particles.

Where the method of preparing the composite material includes using graphene-based material comprising graphene oxide, it may be desirable for the method to comprise a step where the graphene oxide undergoes reduction to form reduced graphene oxide. It has been found that when the graphene-based material used in accordance with the invention comprises graphene oxide that such a reduction step can impart improved physical properties to the resulting composite material.

Accordingly, in one embodiment the graphene-based material comprises graphene oxide and the method comprises a step of reducing the graphene oxide to reduced graphene oxide.

Reducing graphene oxide can be performed by any suitable means. For example, the reduction may be promoted by introducing to the liquid dispersion a reducing agent and/or by increasing the temperature of the liquid dispersion.

Examples of suitable reducing agents that may promote reduction of graphene oxide include ascorbic acid, hydrazine, hydroquinone, amino acids (e.g. aspartic acid) and sodium sulphite.

Temperatures of at least about 75° C. are used to promote thermal reduction of the graphene oxide. Where the temperature used exceeds the boiling point of the liquid used in the dispersion, thermal reduction is typically conducted under pressure to prevent boiling of the liquid.

Where the method of preparing the composite material includes preparing the liquid dispersion by a process comprising the use of a metal oxide nano-particle precursor, the metal oxide nano-particle precursor may not only serve to form the metal oxide nano-particles in situ, but it may also have a second function of acting as reducing agent for any graphene oxide present.

Accordingly, where the liquid dispersion comprises dispersed graphene-based material comprising graphene oxide, the liquid dispersion may be prepared by a process comprising contacting a liquid with metal oxide nano-particle precursor, wherein the metal oxide nano-particle precursor (i) functions as a reducing agent to reduce the graphene oxide, and (ii) is converted in situ to form metal oxide nano-particles.

The liquid dispersion will typically be prepared so as to provide for a dispersion comprising liquid with about 1 part of graphene oxide or graphene, 0.25 parts of porous inorganic micro-particle material, and 2-10 parts of metal oxide nano-particles.

Once the liquid dispersion has been prepared, according to the method of the invention the dispersion is formed into a gel. A "hydrogel" will be formed from an aqueous liquid dispersion, and an "organogel" will be formed from an organic liquid dispersion.

As used herein, the term "gel" is intended to mean a three dimensional monolithic structure that is semi-solid in nature and comprises the liquid used to prepare the dispersion, the graphene-based material, the porous inorganic nano-particles and the metal oxide nano-particles. The solid components of the gel in effect provide a matrix that traps or contains the liquid within the confines of the three dimensional structure thereby imparting its "gel" character.

The liquid dispersion may be converted into a gel by techniques well known to those skilled in the art. Generally, gel formation is promoted by subjecting the liquid dispersion to increased temperature for a suitable period of time. The exact temperature and time to promote gel formation will vary depending upon the nature of the liquid used to prepare the dispersion.

In another embodiment, the gel is promoted by heating the liquid dispersion to a temperature below and within 25° C. (or 15° C.) of the boiling point of the liquid and for a period of time ranging from about 5 to about 20 hours.

In one embodiment, the liquid dispersion is an aqueous dispersion and formation of the gel is promoted by heating the dispersion to a temperature ranging from about 75° C. to about 95° C. for a period of time ranging from about 5 to about 20 hours.

In another embodiment, the dispersion is an organic dispersion and formation of the gel is promoted by heating the dispersion to a temperature below and within 25° C. of the boiling point of the organic liquid for a period of time ranging from about 5 to about 20 hours.

In one embodiment, the liquid dispersion is an aqueous liquid dispersion and the resulting gel is a hydrogel.

In another embodiment, the liquid dispersion is an organic liquid dispersion and the resulting gel is an organogel.

Formation of the gel will to a large extent determine the shape and size of the foam composite prepared in accordance with the method. Accordingly, the shape and size of the foam composite can conveniently be tailored simply by forming the gel in a container having the desired shape and size. A suitable volume of the liquid dispersion will of course be required to substantially fill the desired shape and size of the container.

Once formed, the gel may be washed using a suitable liquid, for example water.

In accordance with the method of the invention, the composite material is formed by removing liquid from the gel. Removing liquid from the gel in effect isolates the composite material from the gel composition. In this context, removing "liquid" from the gel is intended to be a reference to removing any liquid substance present in or on the gel, such as water or organic solvent.

Liquid can be removed from the gel by any suitable means. For example, liquid can be removed by freeze drying or super critical drying.

Generally, substantially all liquid is removed from the gel to afford the composite material.

In one embodiment, liquid is removed from the gel by freeze drying the gel.

The method of preparing composite material in accordance with the invention may further comprise a step of modifying functional groups, on a surface of the composite material. The surface to be modified may be a surface on any constituent component of the composite material.

In one embodiment, the method further comprises modifying functional groups on a surface of the so formed composite material.

The nature of any such functional group modification will generally be dictated by the intended application in which the composite material is to be used. As previously indicated, the composite material as formed may be replete with functional groups, for example oxygen-containing function groups (such as OH). Accordingly, those skilled in the art will have an understanding of reactions that can be performed at the surface of the composite material to modify functional groups thereon.

Modifying surface functional groups of the composite may be performed by reacting those groups with one or more compounds.

In one embodiment, the method further comprises a step of reacting surface functional groups of the so formed composite, material with one or more compounds.

In a further embodiment, reaction of the surface functional groups of the so formed composite material covalently attaches to the composite material sulfur-containing functional groups, oxygen-containing functional groups, phospho-containing functional groups, nitrogen-containing functional groups or a combination thereof.

In a further embodiment, reaction of the surface functional groups of the so formed composite material comprises reacting the functional groups with an amino silane or thio silane compound, such as APTMS or MPTMS.

In a further embodiment, traction of the surface functional groups of the so formed composite material comprises reacting the functional groups with a chelating agent. Examples of suitable chelating agents include N-(trimethoxysilylpropyl) ethylenediamine triacetic acid (EDTA-silane) and N-(trimethoxysilylpropyl)diethylene triamine pentaacetic acid (DPTA-silane).

In yet a further embodiment, reaction of the surface functional groups of the so formed composite material comprises reacting the functional groups with a polymer. Examples of suitable polymers include those comprising nitrogen-containing functional groups (e.g. chitosan).

There is no particular limitation regarding applications in which the composite material according to the invention can be used. The composite material has been found to be particularly well suited for use in removing various target species from a liquid or gas.

Accordingly, the present invention also provides a method of removing a target species from a liquid or gas, the method comprising contacting at least the target species with the composite material according to the invention.

By "removing" a target species from the liquid or gas is meant the species becomes adsorbed to or absorbed within the composite material and is therefore nor longer free to move throughout the liquid or gas. Removing the target species from the liquid or gas in this way therefore enables the species to be physically separated from the liquid or gas simply by physically separating the composite material from the liquid or gas.

According to the method of the invention, at least the target species to be removed is contacted with the composite material. By "contacting" at least the target species with the composite material is meant that the target species makes contact with the surface of the composite material. Generally, such contact will involve submerging the composite material in the gas or liquid or passing the gas or liquid through the composite material such that the gas or lipoid passes through the porous loam matrix. Accordingly, the "contacting" will also typically involve the gas or liquid also making contact with the surface of the composite material.

Where the target species to be removed are ions, they are typically removed from the liquid or gas by being adsorbed into or onto the composite material. Without wishing to be limited by theory, it is believed the ions are adsorbed by two main mechanisms, namely by becoming physically trapped within the composite material and/or by binding with functional groups that present on the surface of the composite material.

Reference to the composite material being used to remove "ions" from a liquid of gas is intended to be a reference to any ionic species that can adsorb to the composite material. The ions may be cations or anions.

Examples of anions that may be removed from a liquid or gas using the composite material include anions derived from one or more of P, CN, As, and Cr.

For example, the anions may be $PO_4^{3-}$, $HPO_4^{2-}$, $H_2PO^{1-}$, $CN^{1-}$, $H_2AsO_4^-$, $HAsO_4^{2-}$, $AsO_4^{3-}$ and chromates.

Examples of cations that may be removed from a liquid or gas using the composite material include cations derived from one or more of Hg, Cd, Pb, Cr, Co, Ni, Cu, Zn, As, Se, Au, U, Po and Th.

For example, the cations may be $Hg^{2+}$, $Cd^{2+}$, $Pb^{2+}$, $Cr^{3+}$, $Co^{2+}$, $Ni^{2+}$, $Cu^{2+}$, $Zn^{2+}$, $As^{3+}$, $U^{3+}$, $U^{4+}$, $Po^{2+}$, $Po^{4+}$, $Se^{3+}$, $Au^+$, $Th^{4+}$ and $Th^{3+}$.

In one embodiment the method involves removing cations derived from one or more of Cd, Hg, Pb and Cr from a liquid or gas comprising the ions.

In a further embodiment, the method includes removing cations derived from Hg from a liquid or gas comprising the ions.

Provided the ions to be removed can be suitably contacted with the composite material, there is no particular limitation regarding the nature of the liquid or gas in which they are contained.

In one embodiment, the liquid comprising the ions is an aqueous liquid.

In another embodiment, the gas comprising the ions is a flue, combustion or exhaust gas.

Those skilled in the art will appreciate that consideration may need to be given to the functional groups present on the surface of the composite material when selecting a composite material to remove a target species from a liquid or gas. For example, it may be desirable that the composite material comprise a surface functionalised with sulphur-containing functional groups, nitrogen-containing functional groups or a combination thereof when the composite material is to be used for removing from a liquid or gas cations derived from Hg.

Depending upon the nature of the target species to be removed from the liquid or gas, it may also be desirable for the composite material to have a negative or positive zeta potential. For example, if ions to be removed are cations, it may be desirable for the composite material to exhibit a negative zeta potential.

Accordingly, in one embodiment the composite material exhibits a negative zeta potential.

Reference herein to "zeta potential" is that which is determined by measurement with a Malvern Zetasizer. To perform the measurement the composites material is typically uniformly crushed and then dispersed in water with 10 mM sodium chloride.

Where ions are to be removed from a liquid, the zeta potential can readily be adjusted by changing the pH of the liquid. For example, at a pH of greater than about 6 the zeta potential of the composite material may be negative. Alternatively, where the pH of the liquid is less than about 6, the zeta potential of the composite material may be positive.

In one embodiment, the zeta potential of the composite material ranges from about −5 to about −20 mV.

In another embodiment, the zeta potential of the composite material ranges from about +5 to about +20 mV.

In a further embodiment, the method involves removing ions from a liquid having a pH of 6 or more, for example ranging from 6 to about 14, or from about 6 to about 10.

Composite materials according to the present invention advantageously exhibit excellent, adsorption capacity for ions. For example, the composite material can exhibit an adsorption capacity ranging from about 400 to about 1000 mg/g.

As used herein the expression "adsorption capacity" is intended to mean the amount of ions (mg) adsorbed per gram, of the composite material (g). In practice, the following equation is used to determine the adsorption capacity (Qt, mg/g)

$$Q_t = \frac{(C_o - C_t) * V}{M}$$

where $C_o$ and $C_t$ are the initial and time t concentration of the ions solution (mg/L), respectively. V is the volume of solution (L) and M is the mass of the composite material used (g).

The composite material in accidence with the invention can also function to remove organic molecules from a liquid or gas. In that case, removal may occur by the organic molecule being adsorbed to and/or absorbed by the composite material.

Other examples of organic molecules that could be removed include oils, such as crude oil, commercial petroleum products (gasoline, diesel petrol) and fats (vegetable oils and paraffin), organic solvents, such as toluene, hexane, pentane, octane, heptane, tetrahydofuran (THF), and dimethylfluoride (DMF), dyes, pesticides, herbicides, and biomolecules such as proteins, peptides, enzymes, nucleic acids.

The invention will hereinafter be described with reference to the following non-limiting examples.

EXAMPLES

The present invention can be better understood by the reference to the following examples. The present invention is not limited to the examples given herein.

Example 1

Preparation of Precursors Required for Preparation Graphene Composites

Example 1a

Graphene Oxide (GO) Precursor

A graphene oxide (GO) was prepared by exfoliation of row graphite ore or concentrated graphite using modified Hummers method. A mixture of concentrated H2SO4/H3PO4 (360:40 mL) was added to 3.0 g of graphite material and 18.0 g $KMnO_4$ that was kept at 50° C. under continuous stirring for 12 h. The reaction was allowed to cool down to room temperature/before pouting onto ice with H2O2 (3 mL). The remaining solid material was then diluted in 200 ml of Milli-Q water and centrifuged at 4000 rpm for 2 h where the supernatant was removed. The solids were washed in succession with 200 mL of HCl (30%) and twice with ethanol (4000 rpm for 4 h), vacuum-dried overnight at room temperature to obtain a brown product of GO which was characterised SEM, TEM. Fourier transform infrared (FTIR), x-ray diffraction (XRD) and Raman spectroscopy. Typical structure of GO sheets is presented in FIG. 1a.

Example 1b

Graphene (GN) Precursor

Reduced graphene oxide (rGO) or graphene (GN) was prepared by reduction of graphene oxide by non-aromatic amino acid L-aspartic aci (L-asp). Dispersions of GO (20 mL) at a concentration of 0.1 mg/mL were heated to 90° C. in tightly sealed glass vials with 2, 3, and 4 mM L-Asp for 6 h. Dispersions were sonicated for 30 min prior to experiments and continuously stirred throughout the reaction. Homogeneous, reduced GO (rGO) dispersions were obtained without aggregation. The pH of the dispersions were adjusted to approx. 9 with 28% ammonia solution (2 μL per mL of dispersion) to promote the colloidal stability of the GO sheets through electrostatic repulsion. The effect on the reduction level of GO was then monitored as a function as time and the extent of the deoxygenation of the GO sheets was characterized. Solid rGO was obtained by centrifugation at 14,500 rpm for 30 min, and then washed in successive with 5% ammonia solution, distilled water and ethanol. For each wash the solution was again centrifuged 14,500 rpm for 30 min and the supernatant was discarded. The final product was dried at 45° C. overnight in a vacuum oven. They presents graphene in the forms of graphene nano to micron sheets which when dispersed in solution are compromised from single to multiple sheets.

Example 1e

Diatomaceous Earth (DE) Precursor

Diatomaceous earth (DE) rocks from fossilized diatoms were obtained from Mount Sylvia Pty. Ltd. diatomite mining company, Queensland, Australia. Diatom silica microparticles were prepared from raw DE material using several steps, which includes: crushing of DE rocks (bead milling), removal of a large DE aggregates, removal of oxide impurities by acid treatment (1M sulfuric acid), followed by particle size separation using filtration and sedimentation process. Typical structure of DE particles is presented in FIG. 1b.

Example 1d

Functionalized Diatomaceous Earth (DE) Precursor

Diatom silica micro-particles prepared in Example 1c were functionalized using the typical silanization process. The DE material (1.0 g) as suspended in 30 mL of toluene under a static dry nitrogen atmosphere. Subsequently, 0.32 mL of water was added to the mixture that was stirred for 1-2 h at room temperature followed by addition of 1.7 mL of APTES solution drop wise and refluxed for 6 h. The APTES modified DE (APTES-DE) were collected by centrifugation and washed several times with isopropanol and toluene before drying in a desiccator under vacuum at ambient temperature.

Example 2

Preparation of Graphene Based Composite Material

Example 2a

GN-DE-αFeOOH Aerogel

Figure 2:
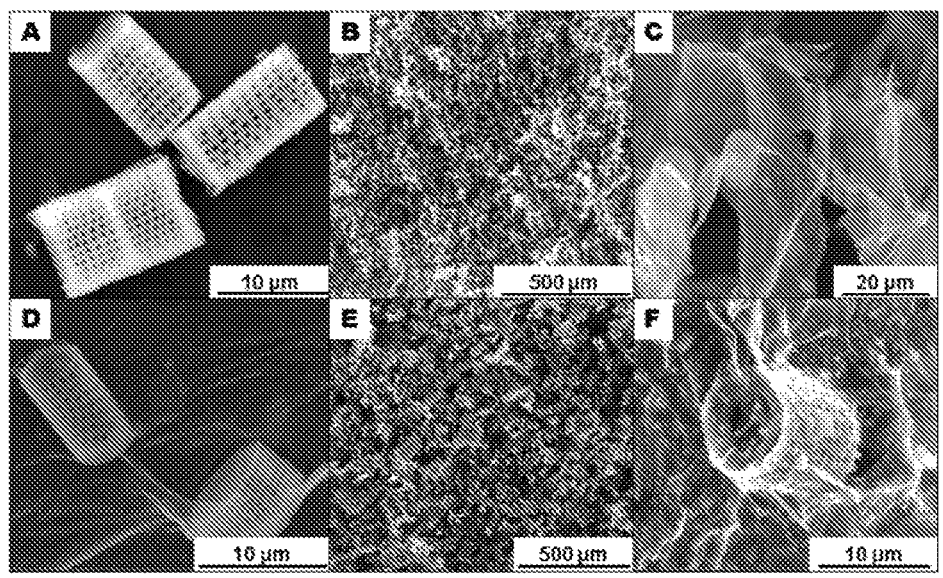
FIG. 2 illustrates characterization structural composition and morphology of prepared graphene-based composite. SEM images of (a) a) SEM image showing the structure of the diatom particles prepared from the raw DE material (rocks) is presented in Fig. a. The image depicts a characteristic structure of *Aulacoseira* sp. (major diatom species, >90%), with a perforated cylindrical shell and an opening at one end. Regularly spaced rows of pores of ~300-500 nm in diameter are located along the frustule shell wall, b) low resolution SEM image of the prepared graphene-DE (GN DE) aerogel shows the 3D network structure prepared after freeze drying with a foam (spongy) structure and interconnected porous network with pore diameters ranging from sub-micrometers to several micrometers. c-d). high resolution SEM images of the GN-DE aerogels show a well-attachment of DE to the graphene sheets. The pore walls consist of very thin layers of graphene sheets with DE particles trapped in between, hence avoiding the agglomeration between the graphene sheets to increase the layer spacing between them, (e) SEM image of graphene-DE modified with mercaptosilane (MPTMS) multi-layer (GN-DE-SH), and (f) high resolution image of GN-DE-SH aerogel showing the thin film of MTMS multilayer covered on both the DE particle and graphene sheets.
Figure 3:
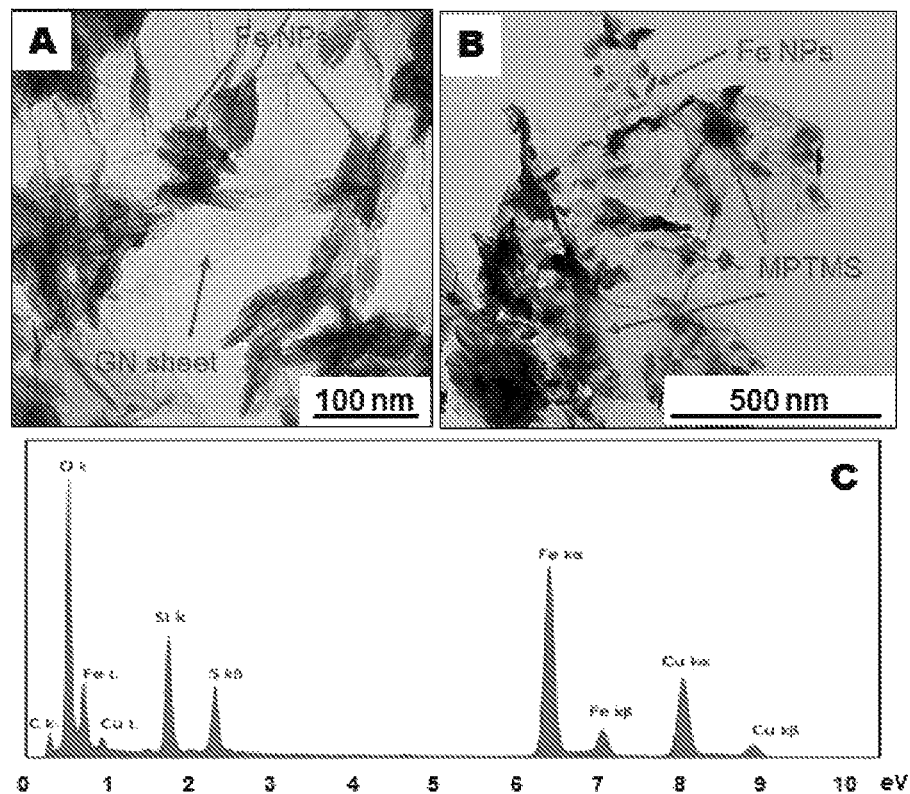
FIG. 3 illustrates structural composition of prepared graphene-based composites focused to show deposition of metal-oxide nano-particles on graphene sheet. TEM images of (a) graphene sheets decorated with Fe nano-particles ($\alpha$FeOOH) formed by reduction process taken from graphene aerogel composite before and after modification with mercaptosilane (MTMS), (b) the inclusion of darker parts showing the attachment of the sulphuric layer (MTMS), and (c) EDX of the modified graphene-DE aerogel. TEM image of the GN-DE aerogel before confirmed formation of rod-like iron nano-particles ($\alpha$FeOOH) on the graphene nano-sheets formed during the reduction process. Further attachment of MPTMS on the GN-DE aerogel resulted in a partial shadowing of the graphene sheets. Energy dispersive spectrometry (EDX) results presented clearly shows that the graphene sheets contained both iron (Fe) and thiol groups after MPTMS modification.
Figure 4:
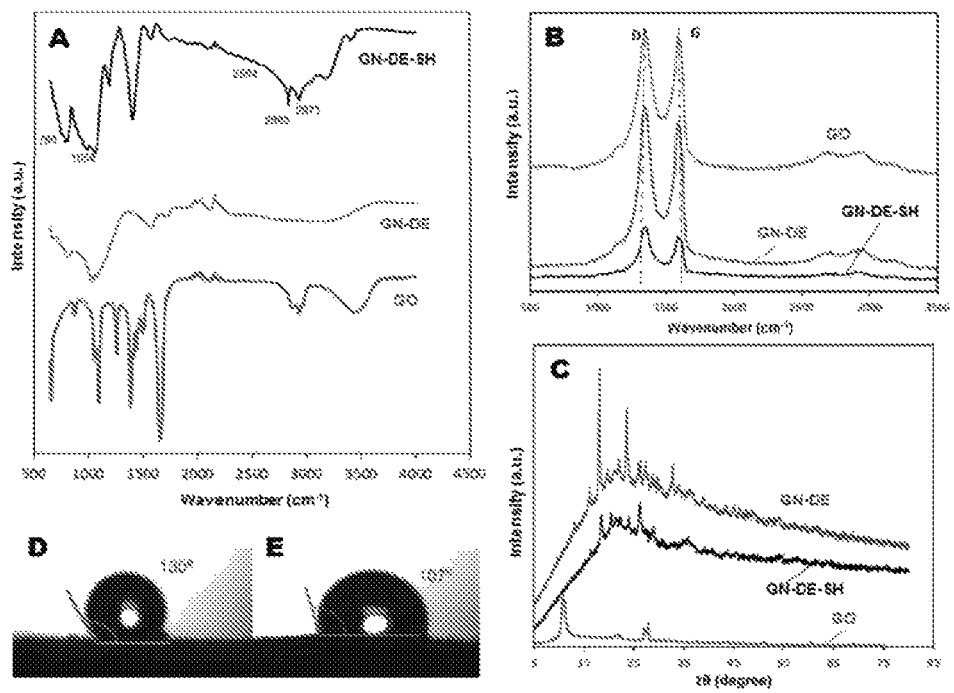
FIG. 4 illustrates the characterization of chemical composition of prepared graphene-based composite showing (a) FTIR, (b) Raman, and (c) XRD spectra of graphene oxide (GO), graphene-DE (GN-DE) aerogel, and modified graphene-DE aerogel (GN-DE-SH). Contact angle measurements of (d) GN-DE and (e) GN-DE-SH aerogels.
Figure 5:
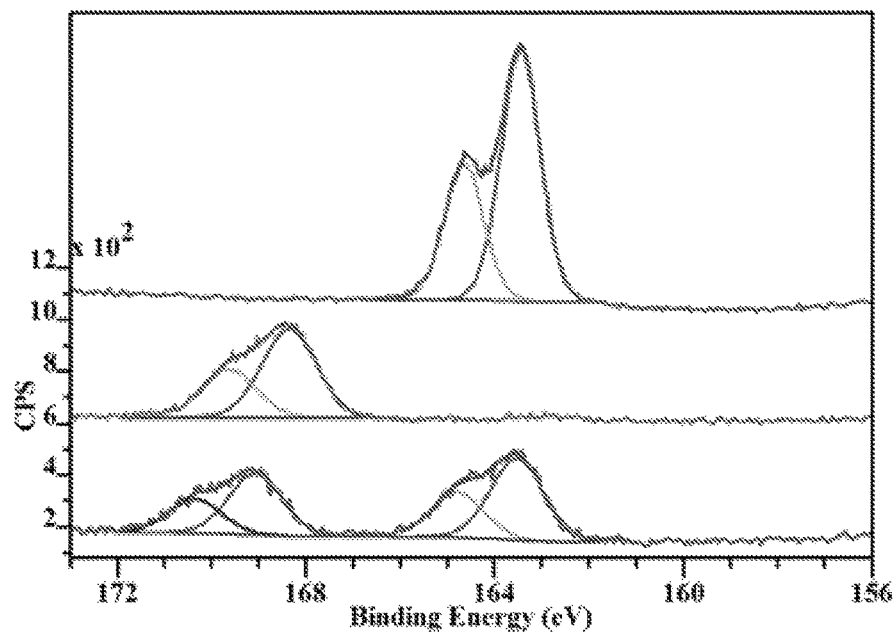
FIG. 5 illustrates elemental composition of chemically modified graphene composite characterized by XPS showing the presence of sulphur groups. a) High resolution S2p spectra of GN-DE-SH (3 h), b) GN-DE and c) GN-DE-SH with fitted curve components. The high resolution S2p data shows spectra for the different GN-DE aerogels. The binding energy (BE) position of the peaks provides information on the nature of the sulfur functional groups present. Based on known chemical shifts the spectra show thiol (SH) and sulfate (SO4) functionalities.

A graphene oxide (GO) prepared by exfoliation of graphite was added to water and sonicated for 1 h to obtain a well-dispersed solution of GO with concentration of 1-4 mg/L. To this solution, Diatomaceous Earth (DE) porous silica micro-particles (modified or unmodified) in ratio (3:1 to 10:1) were added and the mixture was sonicated for another 0.5 h to form a uniform GO-DE dispersion. 1 mM of $FeSO_4$ was added into the GO-DE aqueous suspension an the pH of the solution was adjusted to 3. Subsequently the mixture was poured into glass vials, sealed and placed in a 90° C. silicon oil bath to for 6-8 h. After the reaction occurred 3D black monoliths of graphene hydrogel composite were obtained that were washed a few times with water to remove residues. The hydrogel was freeze dried for 24 h to obtain the corresponding GN-DE-αFeOOH aerogel. A SEM image showing the structure of the diatom particles prepared from the raw DE material (rocks) is presented in FIGS. 2a and 3a. The image depicts a characteristic structure of *Aulaeoseira* sp. (major diatom species, >90%), with a perforated cylindrical shell and an opening at one end. Regularly spaced rows of pores of ~300-500 nm in diameter are located along the frustule shell wall. The schematic of this process is shown in FIG. 1. The prepared GN-DE aerogels after freeze drying had a spongy appearance and an interconnected 3D porous network with pore diameters ranging from submicrometer to several micrometer as showed in the low and high resolution SEM images (FIG. 2b-c). The pore walls consist of very thin layers of graphene sheets with DE particles trapped in between, hence avoiding the agglomeration between the graphene sheets (FIG. 2d) to increase the layer spacing between them. Attachment of MPTMS on GN-DE aerogels through the chemical vapor deposition method resulted in a multilayer of MPTMS throughout the aerogel structure (FIG. 2c-f).

Example 2b

GN-DE-$Fe_3O_4$ Aerogel (Magnetic)

1 mM of $FeSO_4$ was added into GO-DE dispersion prepared in Example 2 and the pH in solution was adjusted >10. Subsequently, the mixture was poured into glass vials, sealed and placed in a 90° C. silicon oil bath to for 6-8 h. After the reaction occurred 3D black monoliths of graphene hydrogel composite was obtained that were washed a few times with water to remove residues. The hydrogel was freeze dried for 24 h to obtain the corresponding GN-DE-$Fe_3O_4$ aerogel which has magnetic properties.

Example 2c

GM-DE-metal Nanoparticles Aerogel

Reducing agents $NaBH_4$ and Silver nitrate solution was added into GO dispersion at 60° C. for 8 hours by using a magnetic stirrer in order to reduce GO and form Ag nanoparticles. After the reaction occurred 3D black monoliths of graphene hydrogel composite were obtained that were washed a few times with water to remove residues. The hydrogel was freeze dried for 24 h to obtain the corresponding GN-DE-AgNP aerogel.

Example 2d

Functionalized GN-DE-αFeOOH Aerogel

GN-DE-αFeOOH aerogels were modified with MPTMS to chemically functionalize the inner and outer surface of the porous aerogels with organosilanes with thiol functional groups using chemical vapour deposition (CVD) method. A mass of aerogels (i.e. 100 mg) were placed on a copper mesh that was mounted on top of a beaker containing a few microliters (i.e. 500 µL) of MPTMS. The beaker was put inside a stainless steel autoclave, sealed and placed in a 135° C. oven for 1 to 3 h. Physisorbed MPTMS molecules were removed from the surface of MPTMS functionalized aerogels with acetone and water, and the silanization method was verified by different analytical methods including SEM, TEM, EDAX, FTIR and XRD (FIG. 2, FIG. 3, FIG. 4, FIG. 5 and FIG. 6).

Example 3

Characterizations

All the prepared materials including precursors, GO, DE, nanoparticles and composites GN-DE-NP aerogels before and after functionalization were characterized with different analytical techniques to confirm their morphology, structure, interfacial properties and chemical composition. Scanning electron microscopy (FE-SEM, Quanta 450, FEI, USA) equipped with Energy Dispersive Spectrometer (EDAX) was used to confirm the structure, morphology and chemical composition of prepared materials. Transmission electron microscopy (TEM, CM200, Philips, Netherland) confirmed the preparation of GO, GN and GN/DE decoration of the αFeOOH nanoparticles on the surface of the graphene sheets and successful silanization of the GN-DE aerogels by MPTMS. Series of SEM images are presented in FIG. 2 and FIG. 3 to confirm structure and morphology of prepared graphene composite materials.

Fourier transform infrared (FTIR) spectrums were recorded on a Nicolet 6700 ThermoFisher spectrometer, which further provided evidence for the surface modification of DE, reduction of GO to graphene decorated with iron nanoparticles (NPs) and the surface modification of GN-DE aerogels with organosilane. The FTIR curves of GO, the GN-DE and GN-DE-SH aerogels show characteristic spectra of GO: O—H stretching vibrations at 3487 cm−1, C=C from unoxidized sp2 C—C bonds at 1660 cm−1, C—O vibrations: at 1250 cm−1, C=O stretching of —COOH at 1730 cm−1, HC=C— at 2975 cm−1 and CO—H at 1380 cm−1, while the peak at ~1640 cm−1 is attributed to the deformation of the O—H band of the strongly intercalated water absorbed on GO or C=C skeleton stretching vibration of the aromatic ring. However, the absorbance bands of carbonyl and epoxy of GO decreased in the GN-DE aerogel, representing the reduction of the graphene sheets. Meanwhile, two bands at 659 cm−1 and 3250 cm−1 observed for the GN-DE aerogel are characteristic of OH ions, and the bands at 1502, 1419, 1138 and 887 cm−1 can be ascribe to the Fe—O vibrational mode of αFeOOH nanoparticles. When the GN-DE aerogels were modified with MPTMS to form a multilayer on the surface, two new bands at 2863 and 2973 cm−1 appeared compared to the GN-DE aerogel spectra, resulting from asymmetric and symmetric stretching modes of —$CH_2$ moiety, which is directly related to the carbon chain of the organosilane molecules (FIG. 6a). This evidence along with the peak at 1070 cm−1, related to the Si—O band, indicated that there were particles and a polycondensed network of silane (FIG. 6a). The FTIR spectra for the GN-DE-SH aerogel also showed strong absorption characteristics Si—O bands at 786 and 1058 cm−1. The —SH stretching band was found at 2564 cm−1, which are typically very weak and cannot be detected in the spectra of dilute solution or thin films.

The vibrational characteristics of GO and the prepared aerogel composites were analysed by Raman spectroscopy (LabRAM HR Evolution, Horiba Jvon Yvon Technology, Japan) using a 532 nm laser (mpc 3000) as the excitation source in the range of 500-3500 cm−1. The Raman spectra of GO and the aerogels (GN-DE and GN-DE-SH) displayed two prominent peaks, which is characteristic of the D and G bands (FIG. 4b). The D hand is associated with the disorder in the graphitic structure. The G band corresponds to the in-plane vibration of the sp2-hybridized carbon to sp3-hybridized carbon originating from the destruction of the sp2 structures of the graphite or covalent attachment of functional groups. The G band of the GM-DE and GN-DE-SH coated aerogels are 1594 and 1591 cm−1, respectively and was found to be shifted compared to the GO used as the control due to the charge transfer between the graphene sheets and iron nanoparticles. The intensity ratio of the D and G band (ID/IG) is usually used to evaluate the microstructure quality of the material. The ID/IG in the GN-DE aerogel (1.07) slightly enhanced after the reduction compared with that of GO (1.02), representing the improvement of the disordered graphene sheets. Whereas, the GN-DE-SH aerogel had a greater change in the ID/IG (1.17) compare to the GN-DE aerogel representing the covalent interaction of MPTMS with the GN-DE aerogel. The S—H stretching vibrational bands should appear at ~2500 cm−1 In the GN-DE-SH aerogel spectra but due to the interference of the 2D of graphene this peak could not be identified.

Figure 6:
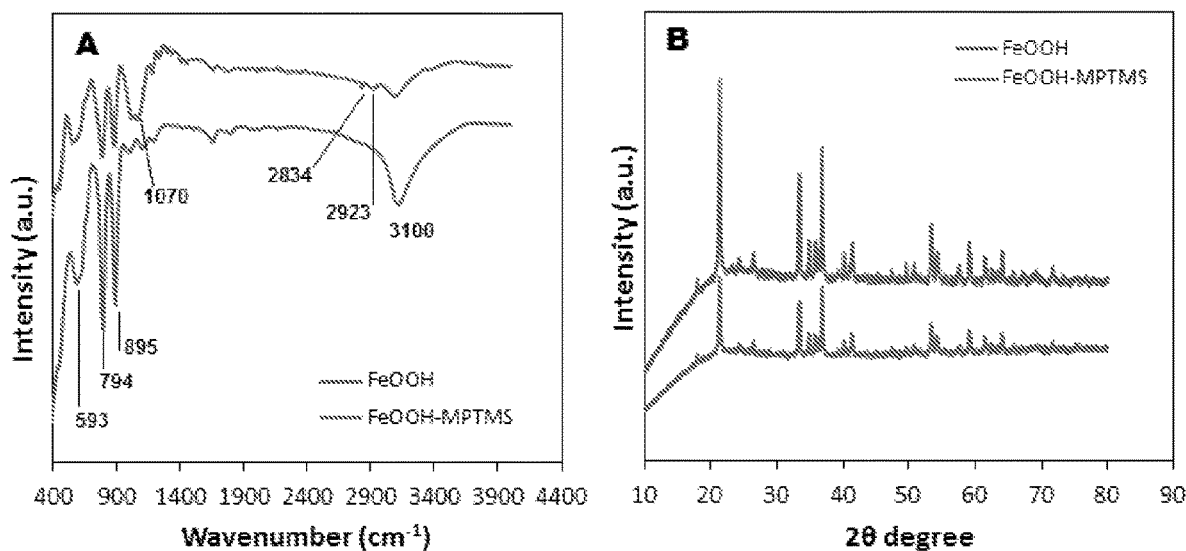
FIG. 6 illustrates the characterization of chemical composition of prepared graphene-based composite focused to confirm the presence $\alpha$FeOOH nano-particles. (a) FTIR and (b) XRD spectra of prepared graphene composite with the $\alpha$FeOOH nano-particles and modified FeOOH nano-particles by MPTMS. FTIR graph of both the nano-particles before and after surface modification are shown in to confirm successful functionalization.

X-ray diffraction (600 Miniflex, Rigaco, Japan) measurements were performed to illuminate the composition of GO and the modified and unmodified GN-DE aerogels. The XRD results on microstructure of GO, the GN-DE and GN-DE-SH aerogels, is presented in FIG. 4c. The intensive peak at 2θ=10.8° represents the (001) reflection of GO due to the introduction of oxygen-containing groups on the graphene sheets during the oxidation of graphite. In contrast, the disappearance of the peak at 10.8° to 18.3° in the (101) plane of the diffraction pattern of the GN-DE aerogel provides further evidence of the GO reduction. For the GN-DE aerogel the major diffraction peak is assigned to the orthorhombic structure of α-FeOOH (JCPDS card No. 29-0713) and the bread peaks: around, 15° and 35° present the existence of amorphous silica (—SiO2) on the DE surface (FIG. 6).

Contact angle measurements were performed using the Attension Theta Optical tensiometer (KSV Instruments, Finland) system in sessile drop mode. Contact angle measurements on the GN-DE and GN-DE-SH aerogels to confirm the increased surface functionalization of the GN-DE-SH aerogels by MPTMS are shown in FIG. 4d. The GN-DE aerogel showed characteristics of a hydrophobic material as the water droplet assumed a large water contact angle of 130±2° while the GN-DE-SH aerogel showed a considerably lower contact angle (107±4°) confirming the attachment of MPTMS on the aerogel, thus rendering its surface hydrophilic.

X-ray photoelectron spectroscopy (XPS) characterization was performed using an AXIS Ultra-DLD (Kratos, UK) instrument equipped with a monochromatic Alkα radiation source (hv=1486.6 eV), operating at 225 W. 15 kV and 15 mA with charge neutralization. Processing and curve-fitting of XPS data was carried out using Casa XPS™ software. High resolution S2p spectra of GN-DE-SH (3 h)), GN-DE and GN-DE-SH (1 h) with fitted curve components are presented in FIG. 5. The binding energy (BE) position of the peaks provides information on the nature of the sulfur functional groups present. Based on known chemical shifts the spectra show thiol (SH) and sulfate (SO4) functionalities. The adsorption of Hg in graphene adsorbent is confirmed by XPS showing Hg4fXPS spectra two peaks centered at 102 and 107 eV, attributed to the Hg4f7/2 and Hg4f5/2 level of the Hg species, respectively (FIG. 10a-b), between mercury and sulphur.

Example 4

Figure 7:
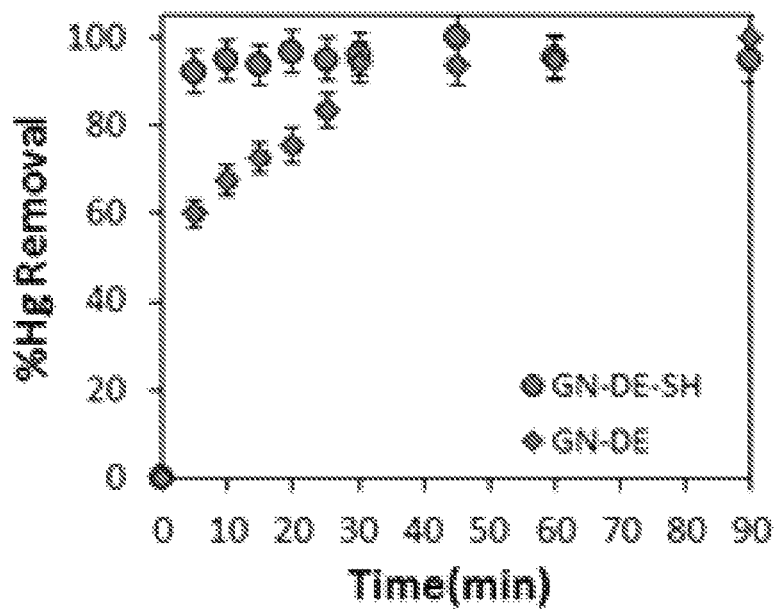
FIG. 7 illustrates characterization of adsorption performance of graphene composite showing (a) adsorption efficacy for removal of mercury ions by graphene composite as a function of time. The performance of unmodified (GN-DE) and modified graphene composites (GN-DE-SH) is presented. The initial mercury concentration used was 200 mg/L.
Figure 9:
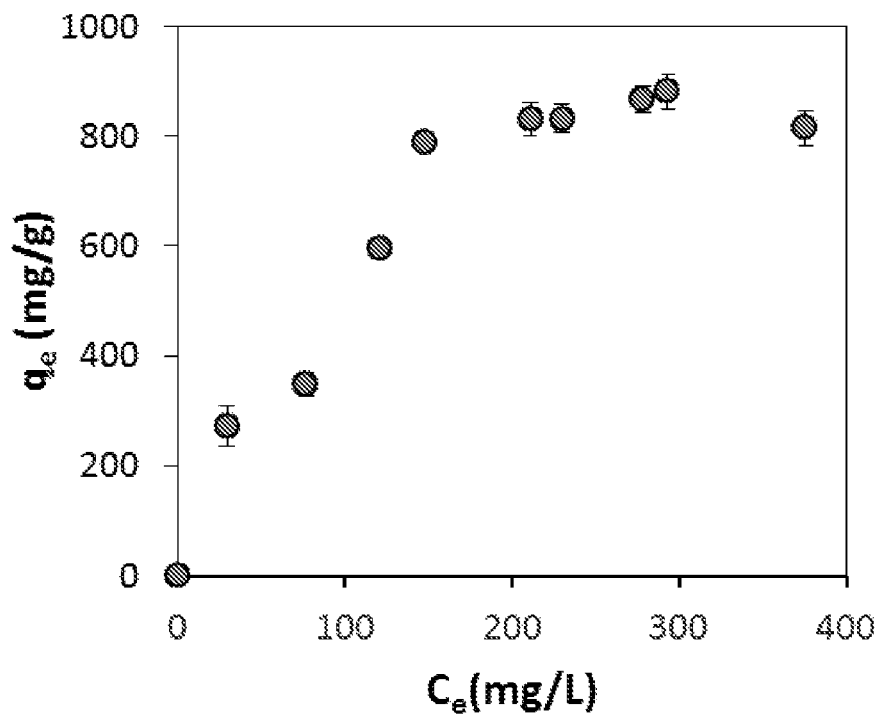
FIG. 9 illustrates the mercury adsorption isotherm of the functionalized graphene composite (GN-DE aerogel modified by MPTMS). Conditions: Hg concentration=300 mg/L, pH=6.5.

Characterization Adsorption Capacity and Efficacy of Mercury Ions by Graphene Composite (GN-DE-SH) Using Hatch Adsorption The adsorption capacity of the graphene composites was characterised using a series of known concentration of $Hg^{+2}$ ions (front 10-500 mg/mL) in water. The adsorbent (eg. 10 mg) was added in Hg solution in 250 mL of the Hg solution at 25±1° C. and mixture was gently stirred for 90 min. The samples of solution were taken at certain time interval and measured with ICP-MS to determine the changes of Hg concentration in solution. A removal efficiency of 95% was obtained for the modified GN-DE-SH aerogel within 5 min. while it took 30 min for the GN-DE aerogel to reach the same removal efficiency (FIG. 7). The time profile curves shows that the equilibrium time is attained within 10 min for the GN-DE-MPTMS aerogel, which is fast. The rapid adsorption of $Hg^{+2}$ the GN-DE-SH aerogel suggesting that the adsorptive sites for Hg+2 exists in the exterior and interior surfaces of the modified aerogels, which are easily accessible to the $Hg^{+2}$ species. The linear correlation Coefficient R2 values for pseudo-second-order kinetic model shows good linear fits with correlation coefficient $R^2$ values of (0.9997 and 0.9380 for the GN-DE-SH and GB-DE aerogels, respectively. The calculated qe values of 628 mg/g from the pseudo-second order model were also in good agreement with the experimental values of qe (exp) for the GN-PE-SH aerogel. The adsorption results presented in FIG. 9 results indicate that the adsorption process is a function of the initial concentration. This concentration-dependent adsorption is applicable only to a certain extent, as the adsorption becomes a concentration-independent process as soon as it reaches the maximum adsorption capacity. It is obvious that for the range of examined mercury concentrations the adsorption saturation occurs. It can be seen that an adsorption, capacity of 881±32 mg/g was obtained for the GN-DE-SH aerogel, at an initial mercury concentration, of 300 mg/L. The obtained adsorption capacity is higher compared with bench-mark commercial adsorbents.

Example 5

Testing of pH Influence on Mercury Adsorption

Figure 8:
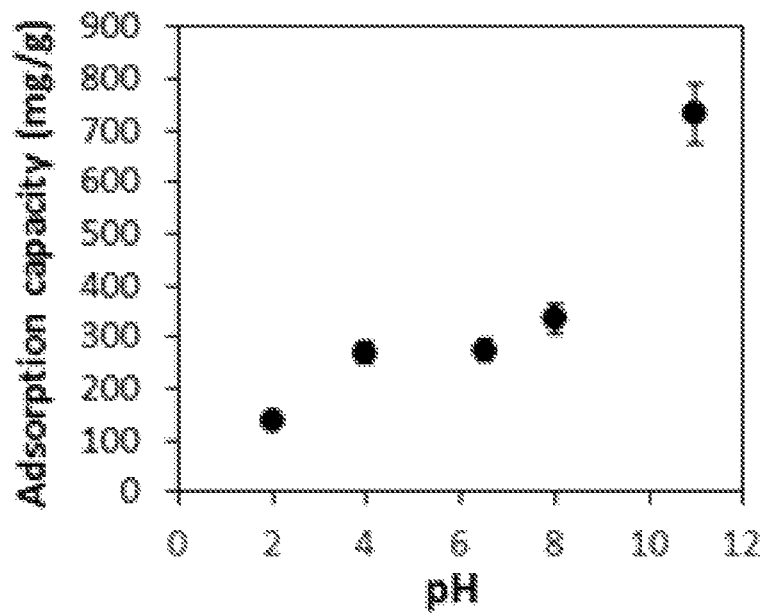
FIG. 8 illustrates characterization of adsorption capacity of mercury by functionalized graphene composite (modified graphene GN-DE-SH aerogels) on the extraction of Hg+2 ions as a function of pH (pH 2-11). The initial mercury concentration used was 60 mg/L, while the other parameters were kept constant.

The conditions described in Example 4 were used for testing the effect of pH in range of pH 2-10 on the removal of Hg, where initial concentration of Hg was (200 mg/L). The pH was adjusted to the targeted value by adding HCl or NaOH and was kept constant during the experiment. For kinetic studies, the experiments were performed at pH 6.5. For each adsorption test performed, the supernatant was removed and immediately filtered through a cellulose acetate membrane with a pore size of 0.22 μm, and the Hg concentration was determined via ICP-MS. Prior to the analysis, the samples were acidified with 2% HNO3. The significant increase of adsorption capacity was found at pH>10 (FIG. 8)

Example 6

Determination Adsorption Kinetics

The amount of heavy metal ions qt (mg/g) adsorbed with graphene adsorbent s at time t, was calculated using the following equation (1)

$$q_t = \frac{(C_0 - C_t) * V}{M} \quad (1)$$

where C0 and Ct are the initial and time t concentration of the heavy metal ions solution, respectively, while V is the volume of solution (L) and M is the mass of the adsorbent used (g). Two-parameter models including Langmuir and Frendlich are commonly used to describe the equilibrium parameters isotherms and molecular adsorption at interfaces.

Langmuir isotherm considers the monolayer coverage of sorption of each molecule onto homogeneous active sites on adsorbents and can be expressed as follows:

$$\frac{C_e}{q_e} = \frac{1}{bq_{max}} + \frac{C_e}{q_{max}} \quad (5)$$

where, $q_e$ is the adsorption capacity (mg/g), $C_e$ is $Hg^{+2}$ concentration (mg/L) at equilibrium; b and $q_{max}$ are the Langmuir constant (1/mg) determined by the intercept and slope of the linear plot of $C_e/q$ versus $C_e$, respectively.

Freundlich isotherm refers to the adsorption on the heterogeneous surface with uniform energy and no restriction to the formation of a monolayer and it is given by equation (6):

$$\log q_e = \frac{1}{n}\log C_e + \log K \quad (6)$$

where K represents the Freundlich adsorption constant (1/mg) and 1/n is the adsorption intensity. These parameters can be calculated from the intercept and slop of the plot of log $q_e$ versus log $C_e$, respectively.

To analyse the adsorption behaviour of the graphene composite the adsorption isotherm data from (FIG. 9) were plotted using the sorption isotherm models, such as Langmuir and Freundlich The value of the Langmuir and Freundlich constants are calculated through the fitting process as listed in Table 1. The correlation coefficient of R2=0.903 as achieved for the Langmuir model, is higher than for the Freundlich (0.864). These results indicate that the adsorption fits well with the Langmuir model, suggesting the monolayer coverage sorption of Hg+2 on the surface of the GN-DE-SH aerogel.

TABLE 1

| Freundlich model | 1/n | 0.226 |
|---|---|---|
| | K | 237 |
| | $R^2$ | 0.864 |
| Langmuir model | $q_{max}$ (mg/g) | 1000 |
| | b (1/mg) | 0.016 |
| | $R^2$ | 0.903 |

Example 7

Adsorption of Mercury Ions Using Graphene Composite as Membrane/Column (GN-DE-SH)

The adsorption capacity of the GN-DE-SH aerogel for removal of $Hg^{+2}$ ions in solution was also performed using a graphene membrane prepared as membrane or fixed-bed column. Graphene adsorbent (300 mg) was gently pressed and packed bra 50 mL plastic syringe with the thickness of the packed aerogels was approx. 500 µm. The feed solution with mercury concentration was flowed through the column at a controlled flow rate and the elate solution was collected at specific time intervals. Concentration of all elutes were determined by ICP-MS for memory ion and the mercury feed solutions used were 4 mg/L and 120 mg/L, and the flow rate was adjusted at 1 mL/min.

Figure 10:
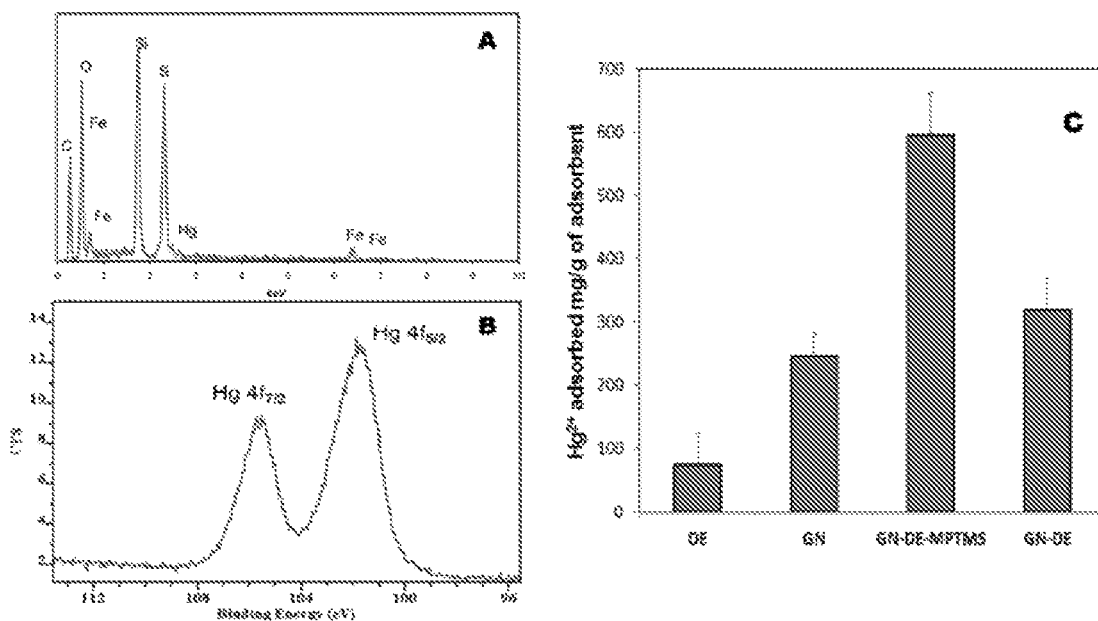
FIG. 10 illustrates characterization of mercury adsorption performance of functionalized graphene composite confirming adsorption of Hg ions on its surface. (a) EDAX, (b) high resolution XPS spectra of graphene composite (GN-DE-SH aerogel) after mercury removal confirming adsorption of Hg in adsorbent.

To demonstrate synergetic impact on adsorption properties based on combined three components in composite on Hg ions adsorption (DE), graphene (GN), GN-DE, and GN-DE-SH aerogels were compared (FIG. 10*c*). Adsorption experiments were performed with 100 mg/L of mercury solution and 10 mg of adsorbent dosage. The results shows that the adsorption capacity of GN-DE aerogel was slightly greater than the GN aerogel but a significant increase (~4 fold) was observed compare to DE. In comparison, the GN-DE-SH aerogel showed a significant adsorption, ~3 fold and ~2 folds higher than the GN and GN-DE aerogels, respectively. These results conclusively show that the method of combination three components with functionalization on the 3D graphene composites creates a novel class of materials with enhanced heavy metal adsorption properties. Compared to previous developed adsorbents for Hg adsorption based on self-assembled monolayer functionalized mesoporous silica, which is commercially available has an adsorption capacity of ~50-300 mg/g). These adsorptions are far less than the 600 mg of mercury/g for the GN-DE-SH aerogel.

Example 8

Removal of Mercury from Different Water Sources

Figure 11:
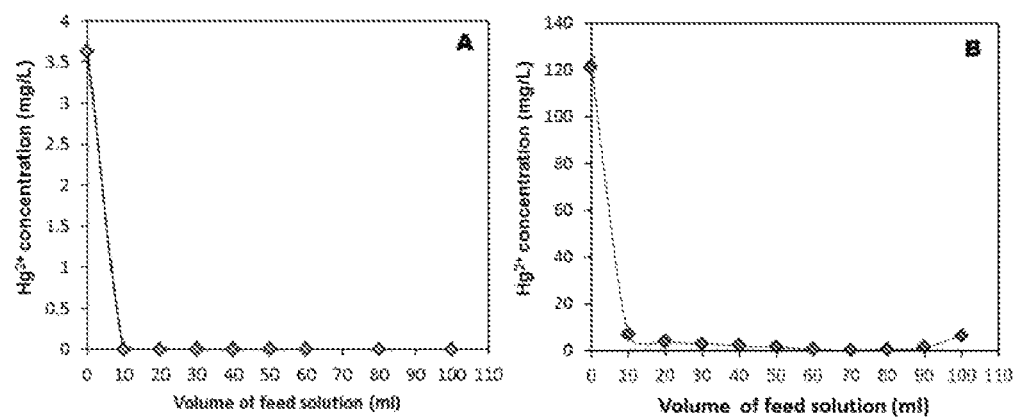
FIG. 11 illustrates characterization of mercury adsorption performance of functionalized graphene composite (membrane GN-DE-MPTMS) using water solution with mercury concentration of (a) 4 mg/L and (b) 120 mg/L with the flow rate of mercury solution of 1 ml/min.

The practical applications of graphene composites adsorbents for removal of mercury was performed three different sources of water, milli-Q, tap and river water (Torrens River, Adelaide, Australia) spiked with desired Hg concentration (120 mg/l (ppm) and 4 mg/l (ppm)). The model system (milli-Q water solution) was adjusted to pH 6.5, whereas the natural water samples (tap and river water) were used as is (natural pH of solution already ~6-7). The adsorbent-solution mixture was stirred for 90 min then a sample was taken and the Hg concentration remaining in the mixture was measured. FIG. 11 shows that the graphene composite membrane can successfully and completely remove Hg from water using both high and low concentration. The tested wafer did not show any traces of mercury ions and graphene composite maintained its adsorption capacity for more than 100 min without of saturation. Although the concentration of mercury was not zero for the 120 mg/L feed solution compare to 4 mg/L, feed solution its performance was still considerable.

Throughout this specification and the claims which follow, unless the context requires otherwise, the word "comprise", and variations such as "comprises" and "comprising", will be understood to imply the inclusion of a stated integer or step or group of integers or steps but not the exclusion of any of the integer or step or group of integers or steps.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates.

The invention claimed is:

1. Composite material having (i) a porous graphene-based foam matrix comprising reduced graphene oxide and (ii) porous inorganic micro-particles and metal oxide nano-particles distributed throughout the foam matrix, wherein a surface of the composite material is functionalised with one or more of: sulfur-containing functional groups comprising a thiol group or a thio silane group, oxygen-containing functional groups comprising a hydroxyl group, phospho-containing functional groups, nitrogen-containing functional groups comprising an amine group, a quaternary ammonium group or an amino silane group, and a chelating agent selected from the group consisting of N-(trimethoxysilylpropyl) ethylenediamine triacetic acid (EDTA-silane) and N-(trimethoxysilylpropyl) diethylene triamine pentaacetic acid (DPTA-silane): wherein the ratio of graphene-based matrix to porous inorganic micro-particles ranges from about 6:1 to about 3:1 by weight.

2. The composite material according to claim 1, wherein the porous graphene-based foam matrix is an aerogel or a xerogel.

3. The composite material according to claim 1, wherein the porous inorganic micro-particles comprise or are made of diatomaceous earth, zeolites, silica, clays carbonates, magnetite, alumina, titania, ZnO, $SnO_2$, $ZrO_2$, MgO, CuO, $Fe_2O_3$, $Fe_3O_4$ or combinations thereof.

4. The composite material according to claim 1, wherein the metal oxide nano-particles are selected from oxides of iron, manganese, aluminium, titanium, zinc, gold, silver, copper, lithium, manganese, magnesium, cerium and combinations thereof.

5. The composite material according to claim 1 having a density ranging from about 0.01 $mg/cm^3$ to about 0.1 $mg/cm^3$.

6. A method of removing a target species from a liquid or gas, the method comprising contacting at least the target species with the composite material according to claim 1.

7. The method according to claim 6, wherein the target species are anions derived from one or more of P, CN, As, and Cr, or cations derived from one or more of Hg, Cd, Pb, Cr, Co, Ni, Cu, Zn, As, Se, Au, U, Po and Th.

8. The method according to claim 6, wherein the liquid is an aqueous liquid and the gas is a flue, combustion or exhaust gas.

9. The composite material according to claim 1, wherein the porous inorganic micro-particles and metal oxide nano-particles are distributed substantially uniformly throughout the foam matrix.

10. The composite material according to claim 1, wherein the porous inorganic micro-particles and metal oxide nano-particles are adhered or bound to the surface of the foam matrix.

11. The composite material according to claim 1, wherein the porous inorganic micro-particles are present in the composite material in an amount ranging from about 20% to about 80% by weight of the composite.

12. The composite material according to claim 1, wherein the metal oxide nano-particles are present in the composite material in an amount ranging from about 5% to about 35% by weight of the composite.

13. A method of preparing composite material having (a) a porous graphene-based foam matrix comprising reduced graphene oxide and (b) porous inorganic micro-particles and metal oxide nano-particles distributed throughout the foam matrix, the method comprising: (i) providing a liquid dispersion comprising dispersed graphene-based material, porous inorganic micro-particles, and metal oxide nano-particles: (ii) forming a gel from the liquid dispersion: (iii) forming the composite material by removing the liquid from the so formed gel; and (iv) reacting surface functional groups of the so formed composite material with one or more compounds to covalently attach to the composite material sulfur-containing functional groups comprising a thiol group or a thio silane group, oxygen-containing functional groups comprising a hydroxyl group, phospho-containing functional groups, nitrogen-containing functional groups comprising an amine group, a quaternary ammonium group or an amino silane group, a chelating agent selected from the group consisting of N-(trimethoxysilylpropyl) ethylenediamine triacetic acid (EDTA-silane) and N-(trimethoxysilylpropyl) diethylene triamine pentaacetic acid (DPTA-silane), or a combination thereof; wherein the ratio of graphene-based matrix to porous inorganic micro-particles ranges from about 6:1 to about 3:1 by weight.

14. The method according to claim 13, wherein the graphene-based material comprises graphene oxide.

15. The method according to claim 13, wherein the liquid dispersion is prepared by a process comprising contacting a liquid with a metal oxide nano-particle precursor, and wherein the metal oxide nano-particle precursor is converted in situ to form the metal oxide nano-particles.

* * * * *